United States Patent
Nakano et al.

(10) Patent No.: US 11,791,102 B2
(45) Date of Patent: Oct. 17, 2023

(54) MULTILAYER CERAMIC ELECTRONIC COMPONENT AND MOUNT STRUCTURE FOR MULTILAYER CERAMIC ELECTRONIC COMPONENT

(71) Applicant: Murata Manufacturing Co., Ltd., Nagaokakyo (JP)

(72) Inventors: Suguru Nakano, Nagaokakyo (JP); Risa Hojo, Nagaokakyo (JP); Akira Tanaka, Nagaokakyo (JP); Toru Nishikawa, Nagaokakyo (JP); Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/126,263

(22) Filed: Dec. 18, 2020

(65) Prior Publication Data

US 2021/0241976 A1    Aug. 5, 2021

(30) Foreign Application Priority Data

Jan. 30, 2020    (JP) .................................. 2020-013672

(51) Int. Cl.
| | |
|---|---|
| *H01G 4/30* | (2006.01) |
| *H01G 4/012* | (2006.01) |
| *H01G 4/008* | (2006.01) |
| *H01G 2/06* | (2006.01) |
| *H01G 4/12* | (2006.01) |

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ............ H01G 2/06; H01G 4/30; H01G 4/008; H01G 4/012; H01G 4/1218; H01G 4/232; H01G 2/065; H10G 4/232
USPC ......... 361/306.3, 301.4, 321.3, 321.2, 321.1, 361/303
See application file for complete search history.

(56) References Cited

U.S. PATENT DOCUMENTS

| | | | | |
|---|---|---|---|---|
| 5,018,048 | A | * | 5/1991 | Shaw ...................... B05D 7/56 29/25.42 |
| 5,125,138 | A | * | 6/1992 | Shaw ..................... H01G 4/306 29/25.42 |
| 5,388,024 | A | * | 2/1995 | Galvagni ................. H01G 4/30 29/25.42 |

(Continued)

FOREIGN PATENT DOCUMENTS

| | | |
|---|---|---|
| JP | 60-002801 U | 1/1985 |
| JP | 2007-188957 A | 7/2007 |
| JP | 2012-004180 A | 1/2012 |

*Primary Examiner* — Arun Ramaswamy
(74) *Attorney, Agent, or Firm* — KEATING & BENNETT, LLP

(57) ABSTRACT

A multilayer ceramic capacitor has a relationship of about 10°≤θ1≤about 50° and a relationship of about 10°≤θ2≤about 50°, where θ1 denotes an angle between a first end surface and a perpendicular extending from a side of a first main surface at a point of intersection of the first main surface and the first end surface, and θ2 denotes an angle between a second end surface and a perpendicular extending from a side of the first main surface at a point of intersection of the first main surface and the second end surface.

20 Claims, 12 Drawing Sheets

(56) References Cited

U.S. PATENT DOCUMENTS

| | | | |
|---|---|---|---|
| 8,842,411 B2* | 9/2014 | Zhang | H01G 4/35 |
| | | | 361/301.4 |
| 9,780,465 B1* | 10/2017 | Hartman | H05K 1/14 |
| 2017/0125167 A1* | 5/2017 | Kawakami | H01G 4/236 |
| 2017/0345576 A1* | 11/2017 | Tsuyoshi | H01G 4/012 |
| 2018/0082780 A1* | 3/2018 | Sasaki | H01F 27/29 |
| 2019/0103225 A1* | 4/2019 | Han | C23C 16/45555 |

* cited by examiner

COMPARATIVE EXAMPLE 1

COMPARATIVE EXAMPLE 4

$\theta 1 = 0°$
$\theta 2 = 0°$
$\theta 4 = 90°$

MULTILAYER CERAMIC ELECTRONIC COMPONENT AND MOUNT STRUCTURE FOR MULTILAYER CERAMIC ELECTRONIC COMPONENT

CROSS REFERENCE TO RELATED APPLICATIONS

This application claims the benefit of priority to Japanese Patent Application No. 2020-013672 filed on Jan. 30, 2020. The entire contents of this application are hereby incorporated herein by reference.

BACKGROUND OF THE INVENTION

1. Field of the Invention

The present invention relates to a multilayer ceramic electronic component and a mount structure for the multilayer ceramic electronic component. In particular, the present invention relates to a multilayer ceramic electronic component including an external electrode with a multilayered structure and a mount structure for the multilayer ceramic electronic component.

2. Description of the Related Art

Recent electronic devices, such as cellular phones and portable music players, have a smaller size and a lower profile. Accordingly, multilayer ceramic electronic components mounted in the smaller-size, lower-profile electronic devices also have a smaller size and a lower profile.

In particular, the lower-profile multilayer ceramic electronic components are increasingly mounted in a very narrow gap even when, for example, they are used while being embedded in circuit boards or are mounted on surfaces of the circuit boards. With an increasingly lower profile of a multilayer ceramic electronic component as described above, the mechanical strength of the multilayer ceramic electronic component decreases, leading to a strong desire to ensure the mechanical strength.

For example, Japanese Patent Laid-Open No. 2012-4180 discloses a lower-profile multilayer ceramic electronic component. In the multilayer ceramic electronic component disclosed in Japanese Patent Laid-Open No. 2012-4180, external electrodes are formed by the following methods. For external electrodes located on the opposite main surfaces of a ceramic body (multilayer body), a conductive paste is applied by screen printing onto a ceramic mother block yet to be divided into pieces in chip form, and for external electrodes located on the opposite end surfaces of the ceramic body, the conductive paste is applied by immersing the end surfaces of the ceramic body into the conductive paste. In other words, in the lower-profile multilayer ceramic electronic component which is disclosed in Japanese Patent Laid-Open No. 2012-4180, the method of forming external electrodes greatly differs between the opposite main surfaces of the ceramic body and the opposite end surfaces of the ceramic body.

When external electrodes are formed by different methods for the opposite main surfaces of the ceramic body and for the opposite end surfaces of the ceramic body, as in the case of a multilayer ceramic electronic component disclosed in Japanese Patent Laid-Open No. 2012-4180, the film formation properties and the thickness of the external electrode may differ between the opposite main surfaces of the ceramic body and the opposite end surfaces of the ceramic body.

As a result, the formation of a plating film may be affected, making it difficult to precisely control the thickness of the plating film. This may cause a thinner portion or a thicker portion in the plating film. It is thus conceivable that strength may vary among the external electrodes (including the plating film), and the mechanical strength of the multilayer ceramic electronic component may decrease.

It is also conceivable that the plating film may be formed with a large thickness for improved film formation properties of the plating film. When the dimensions of the multilayer ceramic electronic component are restricted within dimensional standards, however, the thickness of the ceramic body needs to be reduced further by an amount corresponding to an increase in the thickness of the plating film. This causes the ceramic body to have a much lower profile, and accordingly, the mechanical strength of the multilayer ceramic electronic component may decrease.

Moreover, in Japanese Patent Laid-Open No. 2012-4180, different methods are used for the opposite main surfaces of the ceramic body and for the opposite end surfaces of the ceramic body in the formation of the external electrodes (corresponding to underlying electrodes of the present application). This tends to increase the cost of the methods.

SUMMARY OF THE INVENTION

Preferred embodiments of the present invention provide multilayer ceramic electronic components that are each able to ensure a stable mechanical strength.

A multilayer ceramic electronic component according to a preferred embodiment of the present invention includes a multilayer body including a stack of a plurality of ceramic layers and including a first main surface and a second main surface facing each other in a height direction, a first side surface and a second side surface facing each other in a width direction orthogonal or substantially orthogonal to the height direction, and a first end surface and a second end surface facing each other in a length direction connecting the first main surface and the second main surface with the first side surface and the second side surface; a first internal electrode layer disposed on a corresponding one of the plurality of ceramic layers and located inside the multilayer body; a second internal electrode layer disposed on a corresponding one of the plurality of ceramic layers and located inside the multilayer body; a first external electrode disposed on the first end surface and on a portion of the second main surface; and a second external electrode disposed on the second end surface and on a portion of the second main surface, wherein a relationship B<A is satisfied, where A denotes a length of the multilayer body on the first main surface in the length direction connecting a point of intersection of the first main surface and the first end surface with a point of intersection of the first main surface and the second end surface, and B denotes a length of the multilayer body on the second main surface in the length direction connecting a point of intersection of the second main surface and the first end surface with a point of intersection of the second main surface and the second end surface, and a relationship of about 10°≤θ1≤about 50° and a relationship of about 10°≤θ2≤about 50° are satisfied, where θ1 denotes an angle between the first end surface and a perpendicular extending from a side of the first main surface at the point of intersection of the first main surface and the first end surface, and θ2 denotes an angle between the second end surface and a perpendicular extending from a side of the first main surface at the point of intersection of the first main surface and the second end surface.

Consequently, multilayer ceramic electronic components are provided that are each able to ensure a stable mechanical strength, enable easy soldering during mounting, and enable high-quality mounting.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

1. Multilayer Ceramic Capacitor

Figure 1:
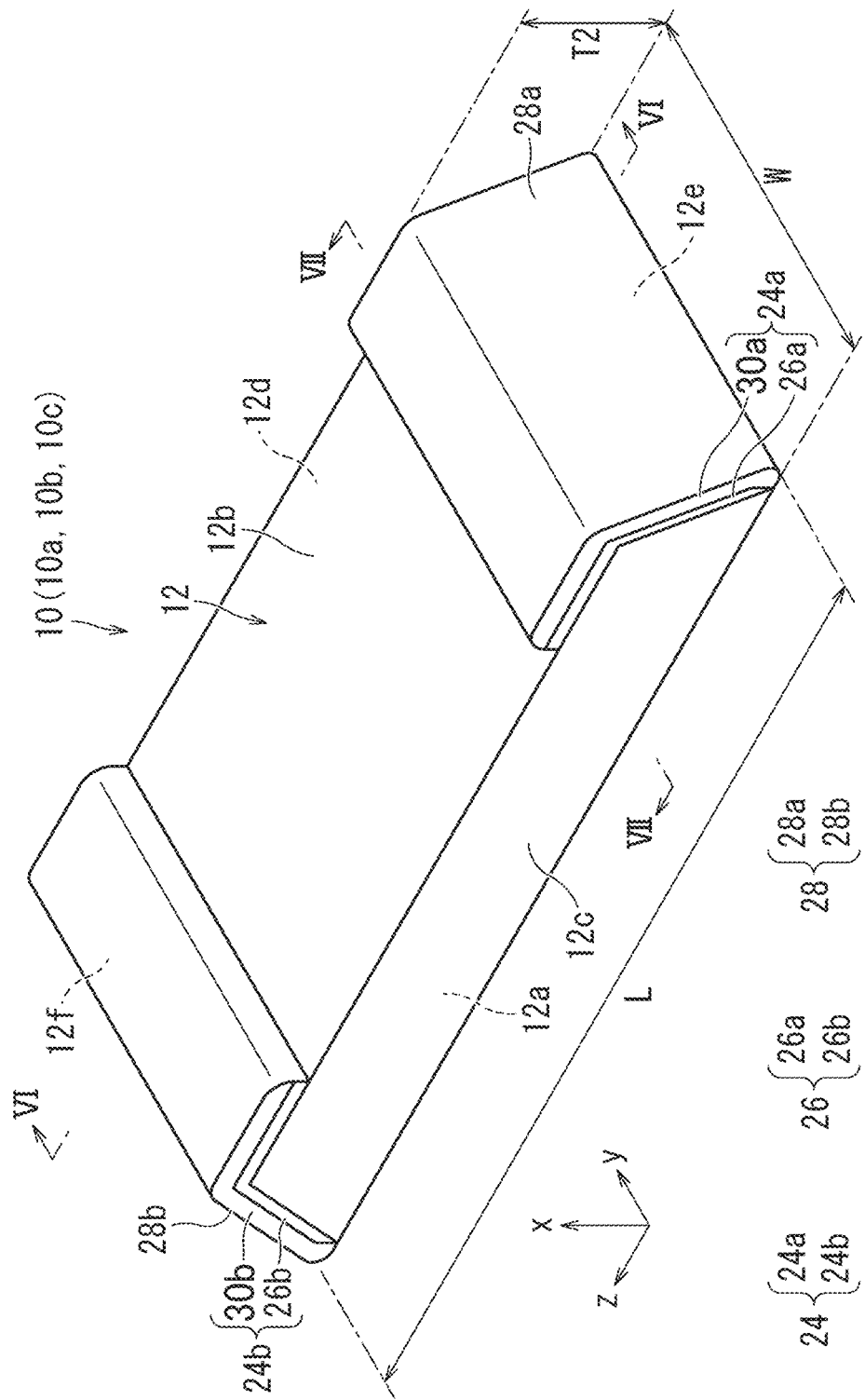
FIG. 1 is an external perspective view of a multilayer ceramic capacitor, which is an example of a multilayer ceramic electronic component according to a preferred embodiment of the present invention.
Figure 2:
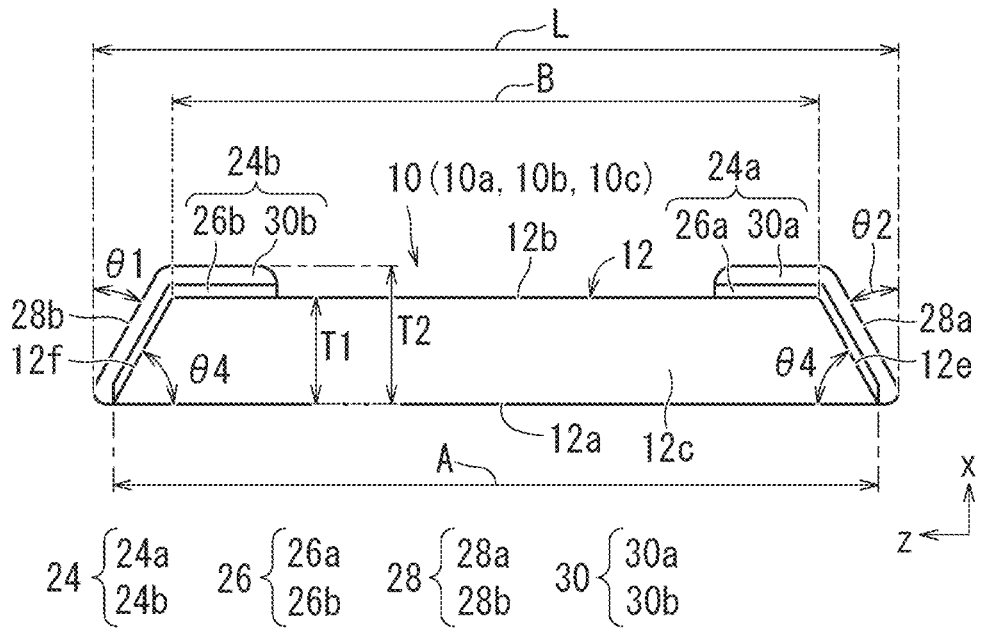
FIG. 2 is a front view of a multilayer ceramic capacitor, which is an example of a multilayer ceramic electronic component according to a preferred embodiment of the present invention.
Figure 3:
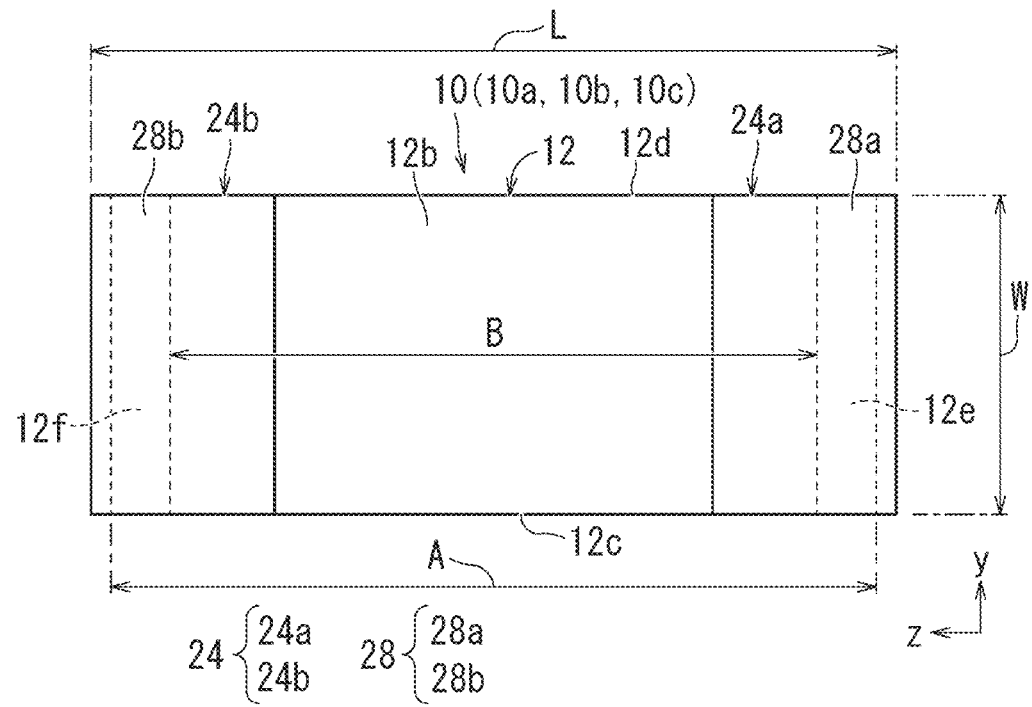
FIG. 3 is a plan view of a multilayer ceramic capacitor, which is an example of a multilayer ceramic electronic component according to a preferred embodiment of the present invention.
Figure 4:
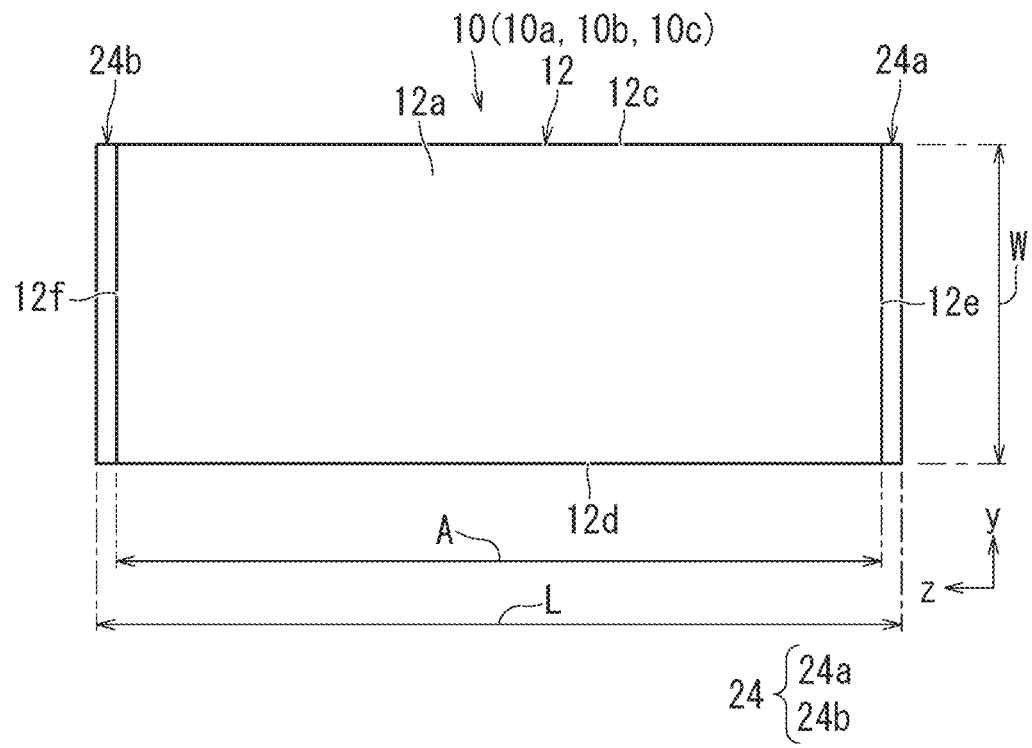
FIG. 4 is a bottom view of the multilayer ceramic capacitor, which is an example multilayer ceramic electronic component according to a preferred embodiment of the present invention.
Figure 5:
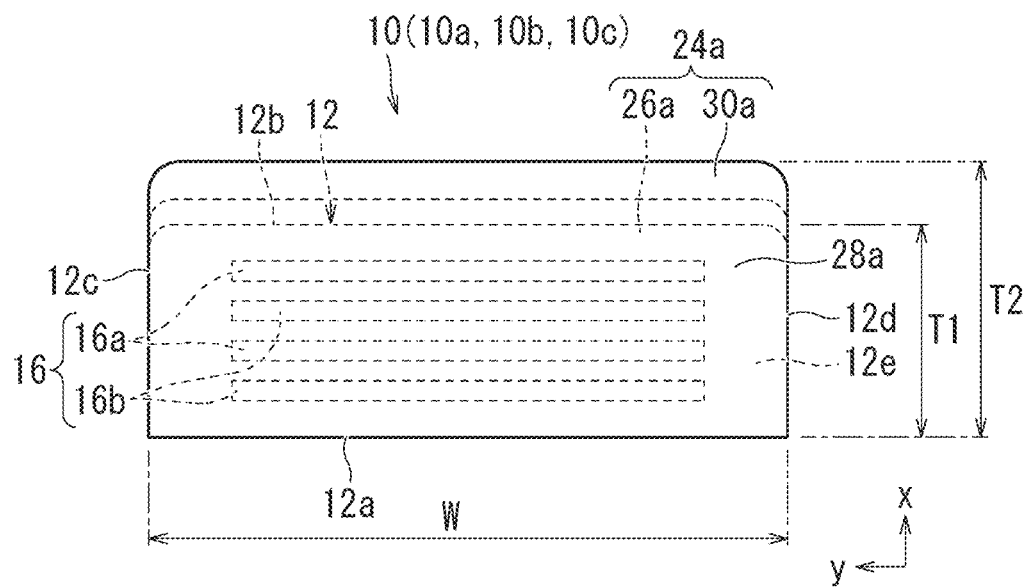
FIG. 5 is a right side view of a multilayer ceramic capacitor, which is an example of a multilayer ceramic electronic component according to a preferred embodiment of the present invention.

A multilayer ceramic capacitor 10 will be described as an example of a multilayer ceramic electronic component according to a preferred embodiment of the present invention. FIG. 1 is an external perspective view (reduced perspective view) of a multilayer ceramic capacitor, which is an example of a multilayer ceramic electronic component according to a preferred embodiment of the present invention. FIG. 2 is a front view of the multilayer ceramic capacitor, which is an example of a multilayer ceramic electronic component. FIG. 3 is a plan view of the multilayer ceramic capacitor, which is an example of a multilayer ceramic electronic component according to a preferred embodiment of the present invention. FIG. 4 is a bottom view of the multilayer ceramic capacitor, which is an example of a multilayer ceramic electronic component. FIG. 5 is a right side view of the multilayer ceramic capacitor, which is an example of a multilayer ceramic electronic component.

The back of the multilayer ceramic capacitor, which is an example of a multilayer ceramic electronic component, is shown as in the front view of FIG. 2. The left side of the multilayer ceramic capacitor, which is an example of a multilayer ceramic electronic component, is shown as in the right side view of FIG. 5.

Figure 6:
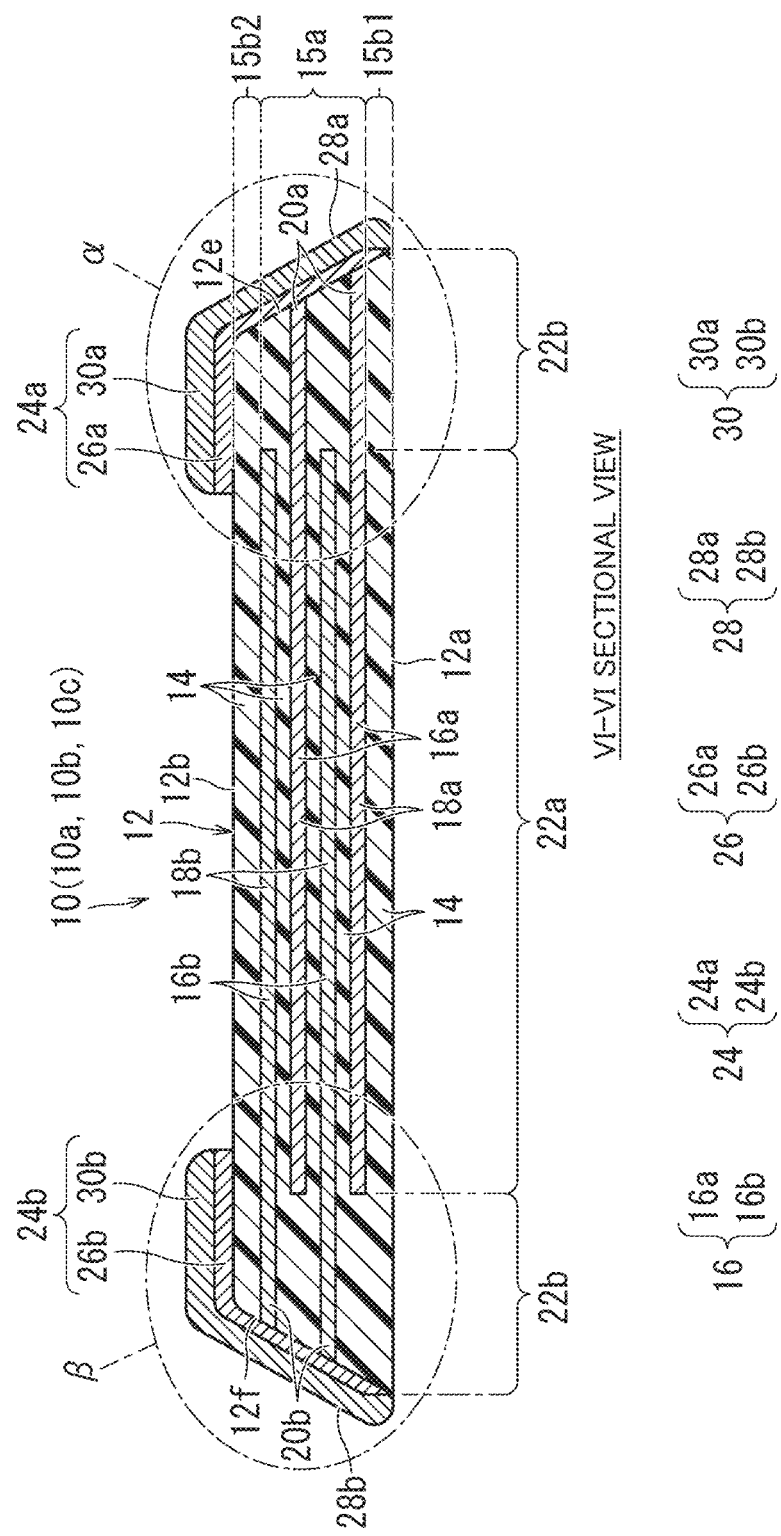
FIG. 6 is a sectional view taken along the line VI-VI of FIG. 1.
Figure 7:
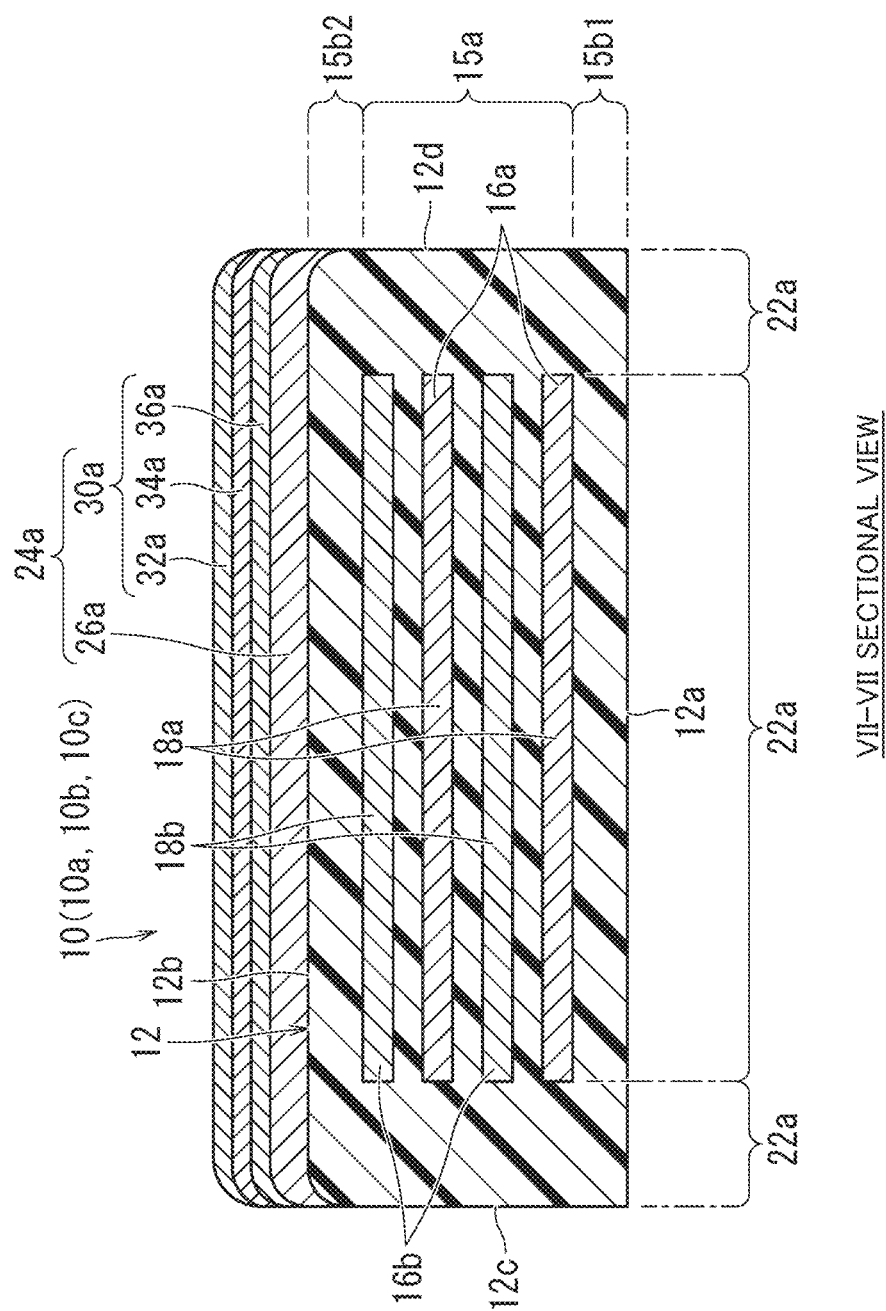
FIG. 7 is a sectional view taken along the line VII-VII of FIG. 1.
Figure 8:
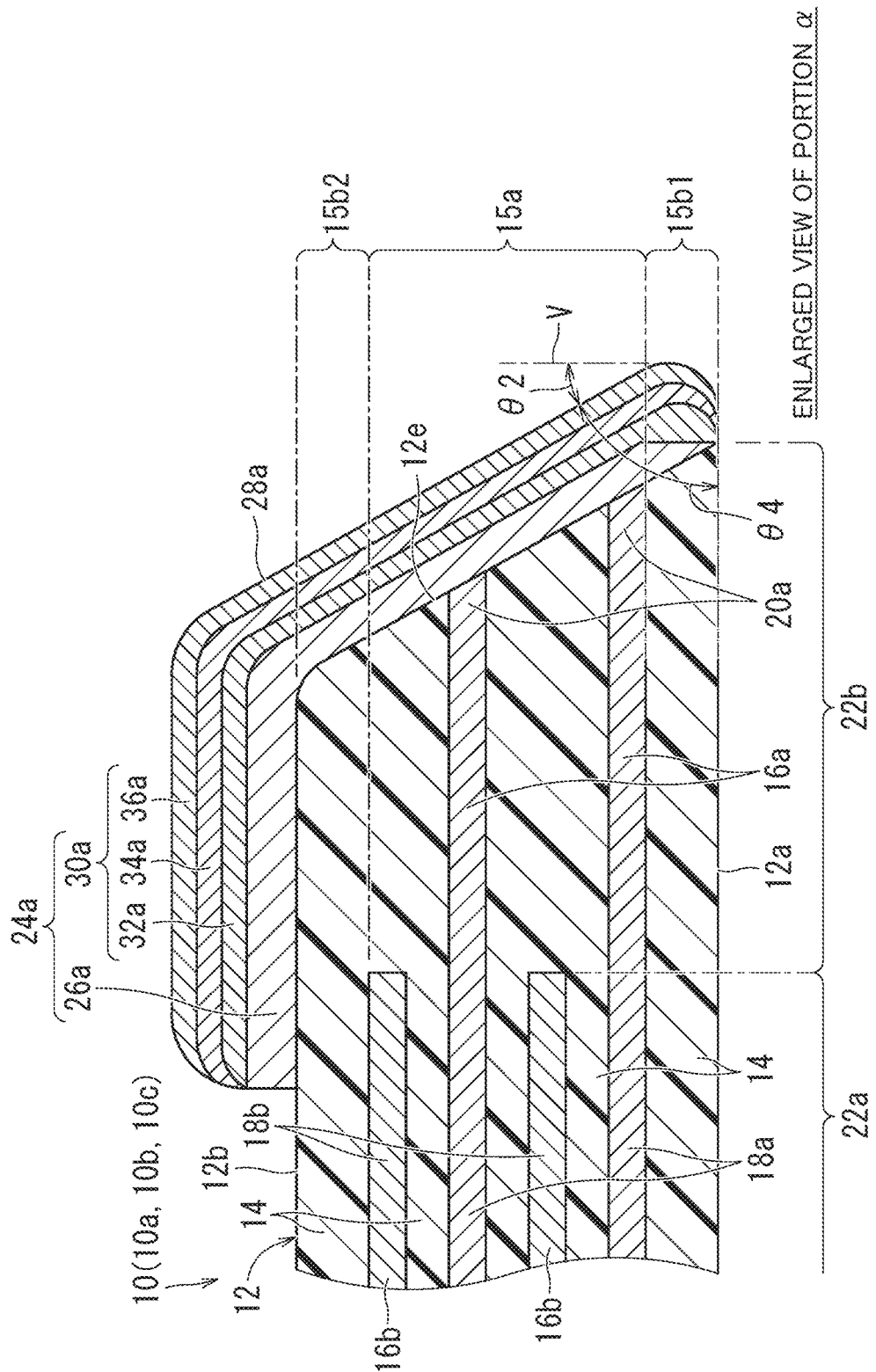
FIG. 8 is an enlarged view of a portion α of FIG. 6.
Figure 9:
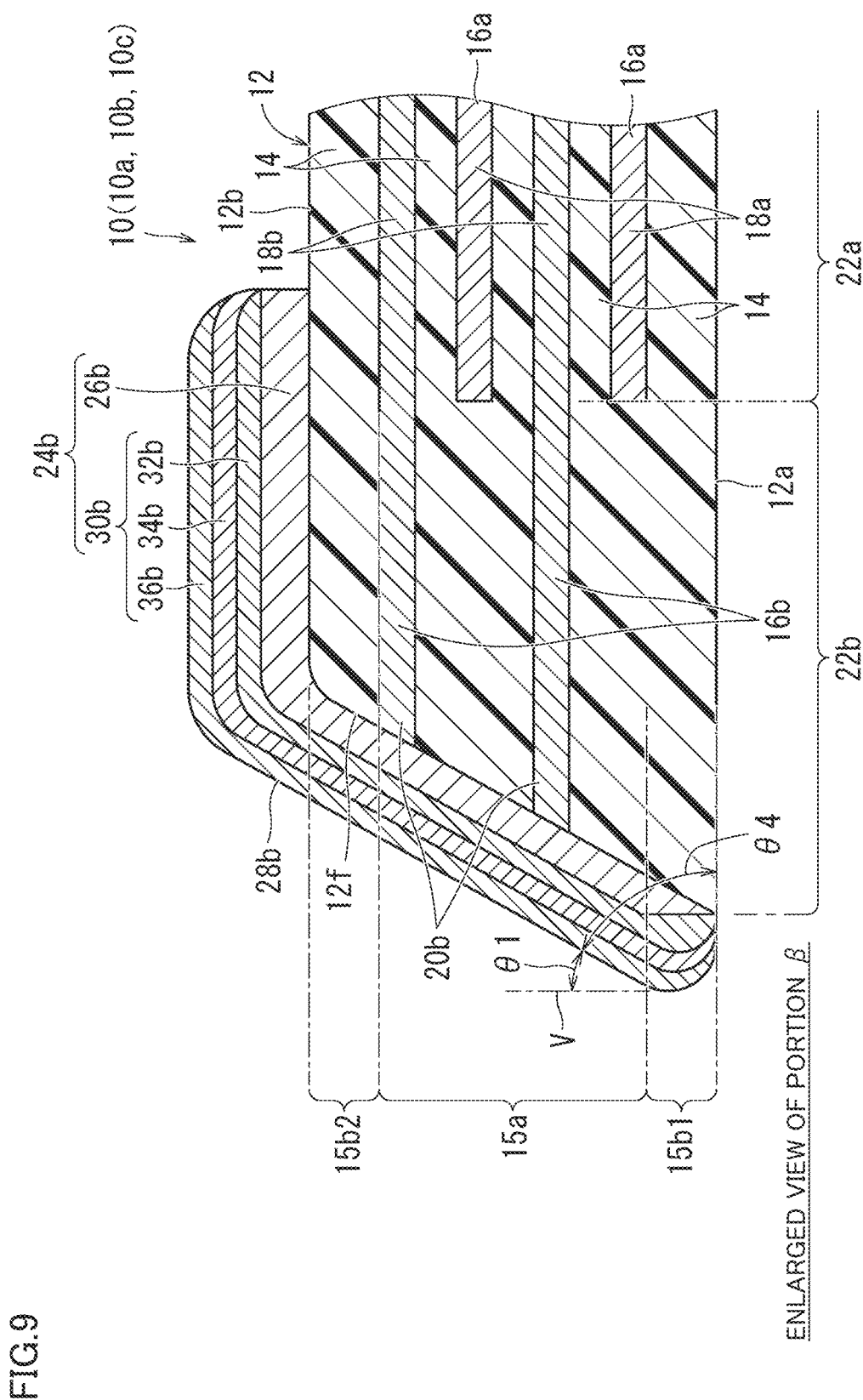
FIG. 9 is an enlarged view of a portion β of FIG. 6.

FIG. 6 is a sectional view taken along the line VI-VI of FIG. 1. FIG. 7 is a sectional view taken along the line VII-VII of FIG. 1. FIG. 8 is an enlarged view of a portion α of FIG. 6. FIG. 9 is an enlarged view of a portion β of FIG. 6.

The multilayer ceramic electronic component according the present preferred embodiment (the present article) can suitably define and function as multilayer ceramic capacitor 10, a ceramic piezoelectric element 10a, a thermistor element 10b, and an inductor element 10c as shown in FIGS. 1 to 8. The present preferred embodiment will describe multilayer ceramic capacitor 10 as an example of a multilayer ceramic electronic component. Multilayer ceramic capacitor 10 according to the present preferred embodiment has a trapezoidal or approximately trapezoidal shape as seen in front view, which includes a multilayer body 12 and an external electrode 24.

A configuration of multilayer ceramic capacitor 10 will be described below in detail. Multilayer ceramic capacitor 10 includes multilayer body 12 and external electrode 24.

Referring to FIG. 2, multilayer ceramic capacitor 10 has a dimension T1 of the multilayer body in a height direction x and a dimension T2 including the multilayer body and external electrode 24, which are set to predetermined values. Multilayer ceramic capacitor 10 also has a dimension L in a length direction z and a dimension W in a width direction y, which are set to predetermined values. Dimension L is preferably not less than about 0.2 mm and not greater than about 1 mm, for example. Dimension T1 is preferably not less than about 27 µm and not greater than about 97 µm, for example, for more stable mounting of multilayer ceramic capacitor 10. Dimension T2 is preferably not less than about 37 µm and not greater than about 110 µm, and more preferably not less than about 40 µm and not greater than about 110 µm for more stable mounting of multilayer ceramic capacitor 10. Dimension W is preferably not less than about 0.2 mm and not greater than about 1 mm, for example.

Multilayer Body

Multilayer body 12 includes a stack of a plurality of ceramic layers 14 and a plurality of internal electrode layers 16. Multilayer body 12 additionally includes a first main surface 12a and a second main surface 12b facing each other in height direction x, a first side surface 12c and a second side surface 12d facing each other in width direction y orthogonal or substantially orthogonal to height direction x, and a first end surface 12e and a second end surface 12f facing each other in length direction z orthogonal or substantially orthogonal to height direction x and width direction y. Multilayer body 12 includes rounded corners and rounded ridge portions. Here, the corner refers to a portion at which three adjacent surfaces of multilayer body 12 meet together, and the ridge portion refers to a portion at which two adjacent surfaces of multilayer body 12 meet together. For example, a protrusion or recess may be provided on a portion or all of first main surface 12a and second main surface 12b, first side surface 12c and second side surface 12d, and first end surface 12e and second end surface 12f.

Herein, multilayer ceramic capacitor 10 according to the present preferred embodiment is characterized as follows, as shown in FIG. 2. A relationship B<A is preferably satisfied, where A denotes a length of multilayer body 12 on first main surface 12a in the length direction connecting a point of intersection of first main surface 12a and first end surface 12e with a point of intersection of first main surface 12a and second end surface 12f, and B denotes a length of multilayer body 12 on second main surface 12b in the length direction connecting a point of intersection of second main surface 12b and first end surface 12e with a point of intersection of second main surface 12b and second end surface 12f. Also, a relationship of about 10°≤θ1≤about 50° and a relationship of about 10°≤θ2≤about 50° are preferably satisfied, where θ1 denotes an angle between first end surface 12e and a perpendicular V extending from a side of first main surface 12a at the point of intersection of first main surface 12a and first end surface 12e, and θ2 denotes an angle between second end surface 12f and a perpendicular V extending from a side of first main surface 12a at the point of intersection of first main surface 12a and second end surface 12f. If angles θ1 and θ2 are not greater than about 50°, the thickness of the thinnest portion of an L gap, which will be described below, is smaller than an allowable thickness after being cut during manufacturing. Consequently, the resultant multilayer ceramic capacitor may be less resistant to entry of water from outside. Also, if angles θ1 and θ2 are not greater than about 50°, the thickness of the thinnest portion of the L gap, described below, is smaller than the allowable thickness. Consequently, a crack generated from the vicinity of the end surface of multilayer body 12 on the mount surface side and remaining within the L gap may develop to an effective layer portion 15a, which will be described below, leading to reduced reliability of the resultant multilayer ceramic capacitor.

In other words, an angle θ4 between first main surface 12a and first end surface 12e or second end surface 12f is preferably not less than about 40° and not greater than about 80°, for example. Although the present preferred embodiment illustrates multilayer ceramic capacitor 10 having a bilaterally symmetrical shape, a bilaterally asymmetrical shape may be provided by appropriately changing angles θ1, θ2, and θ4 within the ranges described above.

In this manner, multilayer ceramic capacitor 10 capable of ensuring a stable mechanical strength is obtained. In particular, more advantageous effects of preferred embodiments of the present invention can be achieved as multilayer ceramic capacitor 10 has a smaller thickness of multilayer body 12, for example, length T1 in height direction x connecting first main surface 12a and second main surface 12b of multilayer body 12 is such that about 27 µm≤T1≤about 97 µm.

More specifically, multilayer body 12 of a preferred embodiment of the present invention having a relationship B<A has an area of second main surface 12b which is smaller than the area of first main surface 12a and has a trapezoidal or substantially trapezoidal sectional shape. This allows the formation of an external electrode simultaneously not only on second main surface 12b but also on first end surface 12e and second end surface 12f, using ink jet or sputtering, for example (which will be described below in detail with reference to FIGS. 10 to 13). In addition, as second main surface 12b has an area smaller than the area of first main surface 12a, multilayer ceramic capacitor 10 can have a higher mechanical strength.

As shown in FIG. 6, multilayer body 12 includes, in the stacking direction connecting first main surface 12a with second main surface 12b, effective layer portion 15a in which internal electrode layers 16 face each other, a first outer layer portion 15b1 including a plurality of ceramic layers 14 located between first main surface 12a and internal electrode layer 16 closest to first main surface 12a, and a second outer layer portion 15b2 including a plurality of ceramic layers 14 located between second main surface 12b and internal electrode layer 16 closest to second main surface 12b.

First outer layer portion 15b1 is located on the first main surface 12a side of multilayer body 12, and is a collection of ceramic layers 14 located between first main surface 12a and internal electrode layer 16 closest to first main surface 12a.

Second outer layer portion 15b2 is located on the second main surface 12b side of multilayer body 12 and is a collection of ceramic layers 14 located between second main surface 12b and internal electrode layer 16 closest to second main surface 12b.

A region sandwiched between first outer layer portion 15b1 and second outer layer portion 15b2 is effective layer portion 15a. First outer layer portion 15b1 and second outer layer portion 15b2 each preferably have a thickness of not less than about 5 µm and not greater than about 30 µm, for example. Although the number of ceramic layers 14 stacked is not particularly limited, not less than five and not greater than 80 ceramic layers 14, for example, are preferably provided including first outer layer portion 15b1 and second outer layer portion 15b2.

Although the dimensions of multilayer body 12 are not particularly limited, dimension T1 of the multilayer body in height direction x is preferably not less than about 27 μm and not greater than about 97 μm, for example, for more stable mounting of multilayer ceramic capacitor 10.

Ceramic layer 14 can be made of, for example, a dielectric material. Such a dielectric material may be, for example, dielectric ceramic including $BaTiO_3$, $CaTiO_3$, $SrTiO_3$, or $CaZrO_3$ as a main component. When the above dielectric material is included as a main component, a material additionally including a subcomponent in a smaller amount than that of the main component, such as a Mn compound, an Fe compound, a Cr compound, a Co compound, or a Ni compound, for example, may be used in accordance with the characteristics desired for multilayer body 12.

When piezoelectric ceramic is used for multilayer body 12, the multilayer ceramic electronic component defines and functions as ceramic piezoelectric element 10a. A specific example of the piezoelectric ceramic material is a lead zirconate titanate (PZT)-based ceramic material.

When semiconductor ceramic is used for multilayer body 12, the multilayer ceramic electronic component defines and functions as thermistor element 10b. A specific example of the semiconductor ceramic material is a spinel-based ceramic material.

When magnetic ceramic is used for multilayer body 12, the multilayer ceramic electronic component defines and functions as inductor element 10c. When the multilayer ceramic component functions as an inductor element, the internal electrode layer defines and functions as a coil-shaped conductor. A specific example of the magnetic ceramic material is a ferrite ceramic material.

In other words, the multilayer ceramic electronic component according to the present preferred embodiment can preferably define and function not only as multilayer ceramic capacitor 10, but also as ceramic piezoelectric element 10a, thermistor element 10b, or inductor element 10c by appropriately changing the material and structure of multilayer body 12.

Ceramic layer 14 preferably has a thickness of, for example, not less than about 0.4 μm and not greater than about 1 μm after firing.

Internal Electrode Layer

Multilayer body 12 includes a plurality of first internal electrode layers 16a and a plurality of second internal electrode layers 16b having a rectangular or approximately rectangular shape as internal electrode layers 16. First internal electrode layers 16a and second internal electrode layers 16b are buried to be alternately and equidistantly disposed with ceramic layer 14 between first internal electrode layer 16a and second internal electrode layer 16b in height direction x of multilayer body 12.

As shown in FIGS. 5 to 9, the internal electrode layers include first internal electrode layers 16a and second internal electrode layers 16b.

First internal electrode layer 16a includes a first facing electrode portion 18a, which faces second internal electrode layer 16b, and a first extending electrode portion 20a, which is located on one end side of first internal electrode layer 16a and extends from first facing electrode portion 18a to first end surface 12e of multilayer body 12. First extending electrode portion 20a includes an end extended to first end surface 12e to be exposed.

Although the shape of first facing electrode portion 18a of first internal electrode layer 16a is not particularly limited, the shape is preferably rectangular or substantially rectangular in plan view. First facing electrode portion 18a may include a corner portion rounded in plan view or inclined (tapered shape) in plan view. Alternatively, the corner portion may have a tapered shape in plan view which is inclined to either direction.

Although the shape of first extending electrode portion 20a of first internal electrode layer 16a is not particularly limited, the shape is preferably rectangular or substantially rectangular in plan view. First extending electrode portion 20a may include a corner portion rounded in plan view or inclined (tapered shape) in plan view. Alternatively, the corner portion may have a tapered shape in plan view which is inclined in either direction.

First facing electrode portion 18a of first internal electrode layer 16a and first extending electrode portion 20a of first internal electrode layer 16a may have the same width, or any one electrode portion may have a smaller width.

Second internal electrode layer 16b includes a second facing electrode portion 18b, which faces first internal electrode layer 16a, and a second extending electrode portion 20b, which is located on one end side of second internal electrode layer 16b and extends from second facing electrode portion 18b to second end surface 12f of multilayer body 12. Second extending electrode portion 20b includes an end extended to second end surface 12f to be exposed.

Although the shape of second facing electrode portion 18b of second internal electrode layer 16b is not particularly limited, the shape is preferably rectangular or substantially rectangular in plan view. Second facing electrode portion 18b may include a corner portion rounded in plan view or inclined (tapered shape) in plan view. Alternatively, the corner portion may have a tapered shape in plan view which is inclined in either direction.

Although the shape of second extending electrode portion 20b of second internal electrode layer 16b is not particularly limited, the shape is preferably rectangular or substantially rectangular in plan view. Second extending electrode portion 20b may include a corner portion rounded in plan view or inclined (tapered shape) in plan view. Alternatively, the corner portion may have a tapered shape in plan view which is inclined in either direction.

Second facing electrode portion 18b of second internal electrode layer 16b and second extending electrode portion 20b of second internal electrode layer 16b may have the same width, or any one electrode portion may have a smaller width.

As shown in FIG. 6, multilayer body 12 includes a side portion (hereinafter referred to as "W gap") 22a between one end of each of first facing electrode portion 18a and second facing electrode portion 18b in width direction y and first side surface 12c and between the other end of each of first facing electrode portion 18a and second facing electrode portion 18b in width direction y and second side surface 12d.

As shown in FIG. 6, multilayer body 12 further includes an end portion (hereinafter referred to as "L gap") 22b between the end of first internal electrode layer 16a opposite to first extending electrode portion 20a and second end surface 12f and between the end of second internal electrode layer 16b opposite to second extending electrode portion 20b and first end surface 12e.

First internal electrode layer 16a and second internal electrode layer 16b may preferably be made of, for example, any appropriate conductive material such as metals including Ni, Cu, Ag, Pd, and Au or an alloy including at least one of these metals, such as a Ag—Pd alloy.

Internal electrode layer 16, that is, each of first internal electrode layer 16a and second internal electrode layer 16b, preferably has a thickness of not less than about 0.2 μm and not greater than about 2.0 μm, for example.

Not less than five and not greater than 80 first internal electrode layers 16a and second internal electrode layers 16b are preferably provided in total.

Although internal electrode layer 16 may be provided in parallel or substantially in parallel or perpendicular or substantially perpendicular to the surface which is mounted on a circuit board 52 (see FIG. 14), internal electrode layer 16 is more preferably provided in parallel or substantially in parallel to the surface which is mounted on circuit board 52.

External Electrode

External electrode 24 is disposed on the first end surface 12e side and the second end surface 12f side of multilayer body 12, as shown in FIGS. 1 to 3 and FIGS. 5 to 9.

External electrode 24 includes an underlying electrode layer 26 including a metal component and a ceramic component and a plating layer 30 covering underlying electrode layer 26. External electrode 24 is disposed to extend from an inclined surface 28 on each of first end surface 12e and second end surface 12f to second main surface 12b to cover a portion of second main surface 12b.

External electrode 24 includes a first external electrode 24a and a second external electrode 24b.

First external electrode 24a is provided on a surface of first end surface 12e and on a portion of a surface of second main surface 12b of multilayer body 12. In this case, first external electrode 24a is electrically connected with first extending electrode portion 20a of first internal electrode layer 16a. Since first external electrode 24a is not provided on first main surface 12a, multilayer body 12 can correspondingly have an increased thickness within the dimensional standard of multilayer ceramic capacitor 10, leading to an improved mechanical strength of multilayer ceramic capacitor 10. First external electrode 24a may extend from first end surface 12e of multilayer body 12 to be disposed on a surface of second main surface 12b and on a portion of a surface of each of first side surface 12c and second side surface 12d.

Second external electrode 24b is disposed on a surface of second end surface 12f and on a portion of second main surface 12b of multilayer body 12. In this case, second external electrode 24b is electrically connected with second extending electrode portion 20b of second internal electrode layer 16b. Since second external electrode 24b is not provided on first main surface 12a, multilayer body 12 can correspondingly have an increased thickness within the dimensional standard of multilayer ceramic capacitor 10, leading to an improved mechanical strength of multilayer ceramic capacitor 10. Second external electrode 24b may extend from second end surface 12f of multilayer body 12 to be disposed on a surface of second main surface 12b and on a portion of a surface of each of first side surface 12c and second side surface 12d.

In multilayer body 12, first facing electrode portion 18a of first internal electrode layer 16a and second facing electrode portion 18b of second internal electrode layer 16b face each other with ceramic layer 14 between first facing electrode portion 18a and second facing electrode portion 18b, thus generating a capacitance. A capacitance can thus be obtained between first external electrode 24a connected with first internal electrode layer 16a and second external electrode 24b connected with second internal electrode layer 16b. Accordingly, the characteristics of the capacitor are provided.

Underlying electrode layer 26 includes a first underlying electrode layer 26a and a second underlying electrode layer 26b. First underlying electrode layer 26a and second underlying electrode layer 26b may each include a plurality of thin film electrodes.

First underlying electrode layer 26a is disposed on a surface of first end surface 12e of multilayer body 12 and extends from first end surface 12e to cover a portion of second main surface 12b. First underlying electrode layer 26a may extend from first end surface 12e of multilayer body 12 to be disposed on a surface of second main surface 12b and on a portion of a surface of each of first side surface 12c and second side surface 12d.

Second underlying electrode layer 26b is disposed on a surface of second end surface 12f of multilayer body 12 and extends from second end surface 12f to cover a portion of second main surface 12b. Second underlying electrode layer 26b may extend from second end surface 12f of multilayer body 12 to be disposed on a surface of second main surface 12b and on a portion of a surface of each of first side surface 12c and second side surface 12d.

First underlying electrode layer 26a and second underlying electrode layer 26b each include at least one layer selected from a baked layer, a thin film layer, and/or the like, for example.

When underlying electrode layer 26 is a baked layer, the baked layer includes a metal component and a ceramic component as described above. The metal component of underlying electrode layer 26 preferably includes at least one selected from Cu, Ni, Ag, Pd, Ag—Pd alloy, Au, and/or the like, for example. The ceramic component may be a ceramic material of the same kind as or a different kind from that of ceramic layer 14. The ceramic component preferably includes, for example, at least one selected from $BaTiO_3$, $CaTiO_3$, $(Ba, Ca)TiO_3$, $SrTiO_3$, $CaZrO_3$, and/or the like. Underlying electrode layer 26 may include a plurality of layers. Underlying electrode layer 26 is obtained by applying a conductive paste including a metal component and a ceramic component to multilayer body 12 and then baking the ceramic component, which is simultaneously fired with ceramic layer 14 and internal electrode layer 16. The thickest portion of underlying electrode layer 26 preferably has a thickness of not less than about 0.1 μm and not greater than about 30 μm, for example.

The multilayer ceramic electronic component according to the present preferred embodiment is multilayer ceramic capacitor 10, and accordingly, the ceramic component of underlying electrode layer 26 is a ceramic material which is a dielectric material in the present preferred embodiment, but is not limited thereto. In other words, a specific ceramic component is different when multilayer ceramic capacitor 10 is made of piezoelectric ceramic, semiconductor ceramic, or magnetic ceramic.

Preferably, thicknesses (thicknesses at the centers of end surfaces) of first underlying electrode layer (baked layer) 26a and second underlying electrode layer (baked layer) 26b in a direction perpendicular or substantially perpendicular to a side of first end surface 12e and a side of second end surface 12f are, for example, not less than about 0.1 μm and not greater than about 6 μm at positions, with a length of a half of the side of first end surface 12e and a length of a half of the side of second end surface 12f, of first underlying electrode layer (baked layer) 26a and second underlying electrode layer (baked layer) 26b located on first end surface 12e and second end surface 12f.

Preferably, thicknesses (thicknesses at the centers of end-to-end dimension) of first underlying electrode layer (baked layer) 26a and second underlying electrode layer (baked layer) 26b in height direction x connecting first main surface 12a with second main surface 12b are, for example, not less than about 0.1 μm and not greater than about 6 μm at positions, each with a length of a half of a length in width direction y, of first underlying electrode layer 26a and second underlying electrode layer 26b located on parts of second main surface 12b.

When underlying electrode layer 26 is a thin film layer, underlying electrode layer 26 is preferably formed by a thin film formation method, such as sputtering or vapor deposition, for example. Herein, an electrode formed by sputtering will be described.

A thin film layer is preferably a sputtering electrode formed by sputtering.

When underlying electrode layer 26 is a sputtering electrode, the sputtering electrode is preferably formed directly on first end surface 12e, on a portion of second main surface 12b, on second end surface 12f, and on a portion of second main surface 12b of multilayer body 12. In the present preferred embodiment, since a relationship B<A is satisfied and the cross-section has a trapezoidal or substantially trapezoidal shape as described above, underlying electrode layer 26 can be formed on first end surface 12e, on a portion of second main surface 12b, on second end surface 12f, and on a portion of second main surface 12b in one step by sputtering from above multilayer body 12. Consequently, underlying electrode layer 26 can have a smaller thickness, and accordingly, multilayer body 12 can have a larger thickness within the dimensional standard of multilayer ceramic capacitor 10. This results in an improved mechanical strength of multilayer ceramic capacitor 10.

The thin film layer defined by a sputtering electrode preferably includes one metal selected from the group consisting of Mg, Al, Ti, W, Cr, Cu, Ni, Ag, Co, Mo, and V, for example.

The thin film layer defined by a sputtering electrode may include a plurality of layers. In other words, a plurality of thin film layers may be provided.

The thickness of the sputtering electrode in height direction x connecting first main surface 12a with second main surface 12b is preferably not less than about 50 nm and not greater than about 400 nm, and more preferably not less than about 50 nm and not greater than about 130 nm, for example.

Plating layer 30 includes a first plating layer 30a and a second plating layer 30b. As shown in FIGS. 6 to 9, first plating layer 30a and second plating layer 30b each may include a plurality of layers. First plating layer 30a and second plating layer 30b each preferably include, for example, at least one selected from Cu, Ni, Sn, Ag, Pd, Ag—Pd alloy, Au, and/or the like.

When multilayer ceramic capacitor 10 is mounted on a surface of a substrate, plating layer 30 preferably has a double-layer structure including a Ni plating and a Sn plating in order. The Ni plating layer prevents erosion of underlying electrode layer due to the solder during mounting of multilayer ceramic capacitor 10, and the Sn plating layer improves wettability of the solder in mounting of multilayer ceramic capacitor 10, thus facilitating mounting. When the plating layer is provided between underlying electrode layer 26 and the Ni plating layer or the plating layer is provided directly on multilayer body 12 without underlying electrode layer 26, a Cu plating layer may be provided between the Ni plating and multilayer body 12. This can reduce or prevent entry of water, such as a plating solution.

The present preferred embodiment illustrates an example of a three-layer structure including a Cu plating, a Ni plating, and a Sn plating, as a preferable example of first plating layer 30a and second plating layer 30b (see FIGS. 6 to 9).

As plating layers (Cu plating layer and Ni plating layer) made of Cu plating and Ni plating are provided so as to cover underlying electrode layer 26, erosion of underlying electrode layer 26 due to the solder used during mounting can be prevented in mounting of multilayer ceramic capacitor 10. Also, as a Sn plating (Sn plating layer) is provided, or a plating layer (Sn plating layer) made of Sn plating is further provided on a surface of the Ni plating layer, wettability of the solder used during mounting can be improved in mounting of multilayer ceramic capacitor 10, thus facilitating mounting.

In the present preferred embodiment, first plating layer 30a includes a first lower plating layer 32a, which is a Cu plating, a first intermediate plating layer 34a, which is a Ni plating, and a first upper plating layer 36a, which is a Sn plating. First plating layer 30a covers first underlying electrode layer 26a.

In the present preferred embodiment, first plating layer 30a is not exposed on the first main surface 12a side. Specifically, first plating layer 30a is disposed on a surface of first underlying electrode layer 26a located on first end surface 12e and extends to a surface of first underlying electrode layer 26a located on second main surface 12b as well.

In the present preferred embodiment, second plating layer 30b includes a second lower plating layer 32b, which is a Cu plating, a second intermediate plating layer 34b, which is a Ni plating, and a second upper plating layer 36b, which is a Sn plating. Second plating layer 30b covers second underlying electrode layer 26b.

In the present preferred embodiment, second plating layer 30b is not exposed on the first main surface 12a side. Specifically, second plating layer 30b is disposed on a surface of second underlying electrode layer 26b located on second end surface 12f and extends to a surface of second underlying electrode layer 26b located on second main surface 12b as well.

First lower plating layer 32a, first intermediate plating layer 34a, and first upper plating layer 36a which are plating layers of first plating layer 30a, and second lower plating layer 32b, second intermediate plating layer 34b, and second upper plating layer 36b which are plating layers of second plating layer 30b each preferably have a thickness of not less than about 2 μm and not greater than about 15 μm, for example. More preferably, first lower plating layer 32a and second lower plating layer 32b, which are Cu plating layers, have, for example, an average thickness of not less than about 5 μm and not greater than about 8 μm, first intermediate plating layer 34a and second intermediate plating layer 34b, which are Ni plating layers, preferably have, for example, an average thickness of not less than about 2 μm and not greater than about 4 μm, and first upper plating layer 36a and second upper plating layer 36b, which are Sn plating layers, preferably have, for example, an average thickness of not less than about 2 μm and not greater than about 4 μm.

When multilayer ceramic capacitor 10 is buried in a substrate, plating layer 30 preferably includes an outermost layer made of a Cu plating layer, though not shown in the present preferred embodiment.

As described above, in multilayer ceramic capacitor 10 shown in FIG. 1, a relationship B<A is satisfied, where A denotes a length of multilayer body 12 on first main surface 12a in the length direction connecting a point of intersection of first main surface 12a and first end surface 12e with a point of intersection of first main surface 12a and second end surface 12f, and B denotes a length of multilayer body 12 on second main surface 12b in the length direction connecting a point of intersection of second main surface 12b and first end surface 12e with a point of intersection of second main surface 12b and second end surface 12f. Accordingly, multilayer body 12 can have an increased thickness within the dimension standard of multilayer ceramic capacitor 10 by an amount of reductions in the thicknesses of underlying electrode layer 26 and plating layer 30. This can readily achieve design assurance of mechanical strength, thus providing multilayer ceramic capacitor 10 with a high degree of reliability.

In multilayer ceramic capacitor 10 shown in FIG. 1, a relationship of about 10°≤θ1≤about 50° and a relationship of about 10°≤θ2≤about 50° are satisfied, where θ1 denotes an angle between first end surface 12e and a perpendicular V extending from a side of first main surface 12a, and θ2 denotes an angle between second end surface 12f and a perpendicular V extending from a side of first main surface 12a at a point of intersection of first main surface 12a and second end surface 12f. Accordingly, a sufficient amount of dimension of the L gap can be ensured, and thus, a resistance to entry of water from outside can be improved, leading to improved moisture resistance reliability of multilayer ceramic capacitor 10.

2. Method of Manufacturing Multilayer Ceramic Capacitor

A non-limiting example of a method ST of manufacturing a multilayer ceramic capacitor, which is an example multilayer ceramic electronic component, will be described with reference to FIGS. 10 to 14.

(1) First, dielectric sheets and an internal-electrode conductive paste are prepared in order to produce multilayer block 40. The dielectric sheet and the internal-electrode conductive paste include a binder and a solvent. Publicly known binder and solvent may be used.

(2) Subsequently, the internal-electrode conductive paste is printed on the dielectric sheet in a predetermined pattern by, for example, screen printing or gravure printing, to thus form an internal electrode pattern. Specifically, a paste made of a conductive material is applied onto the dielectric sheet by a method such as the above-mentioned printing, to thus form a conductive paste layer. The paste made of a conductive material is obtained by, for example, addition of an organic binder and an organic solvent to powdered metal. Regarding the dielectric sheets, outer-layer dielectric sheets, each of which includes no internal electrode pattern printed thereon, are also produced.

Figure 10:
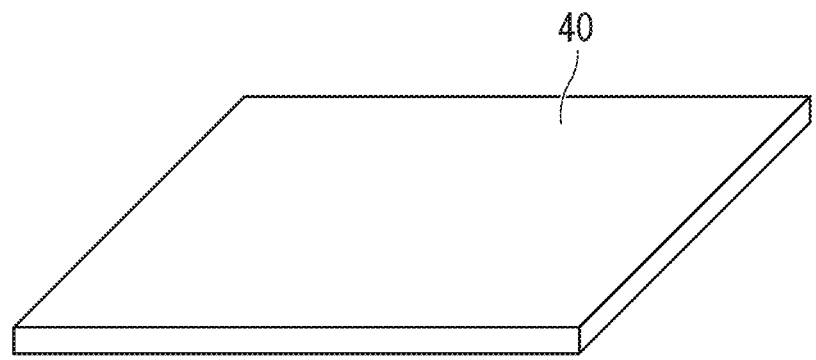
FIG. 10 schematically illustrates a method of manufacturing a multilayer ceramic capacitor according to a preferred embodiment of the present invention, which is an example of a multilayer ceramic electronic component according to a preferred embodiment of the present invention.

(3) The dielectric sheets prepared in (2) are used to produce a multilayer sheet as shown in FIG. 10. Specifically, a multilayer sheet is produced by stacking a predetermined number of outer-layer dielectric sheets, each of which includes no internal electrode pattern formed thereon, alternately stacking thereon ceramic green sheets, each of which includes an internal electrode pattern corresponding to the first internal electrode layer, and ceramic green sheets, each of which includes an internal electrode pattern corresponding to the second internal electrode layer, and stacking thereon a predetermined number of outer-layer dielectric sheets, each of which includes no internal electrode pattern formed thereon.

Figure 11:
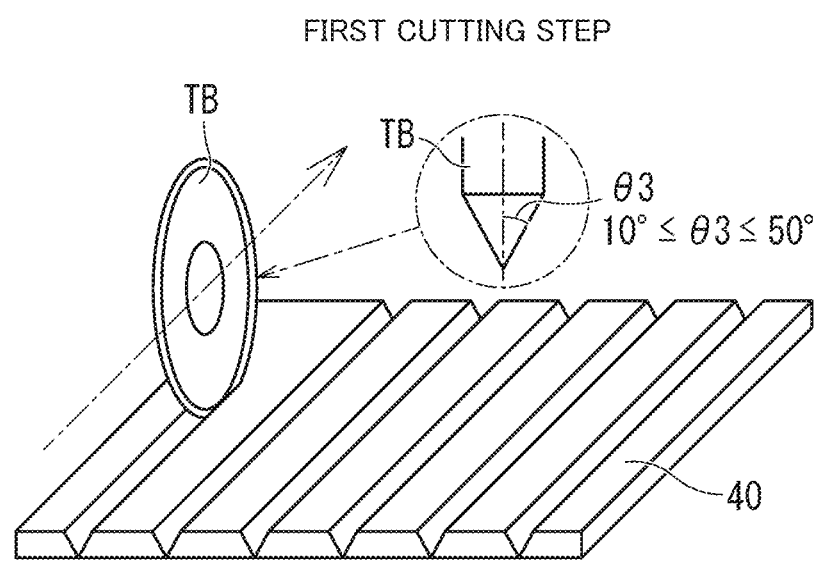
FIG. 11 schematically illustrates a method of manufacturing a multilayer ceramic capacitor, which is an example of a multilayer ceramic electronic component according to a preferred embodiment of the present invention.

(4) The multilayer sheet is pressed in the stacking direction by, for example, isostatic pressing, to thus produce multilayer block 40. Then, multilayer block 40 is cut in a V shape in front view using a dicer with a tapered blade TB which is a cutting blade tapered at an angle θ3, to thus expose the internal electrode layers, as shown in FIG. 11. In the present preferred embodiment, taper angle θ3 is about 10°≤θ3≤about 50°. This step corresponds to a first cutting step ST1.

In the present preferred embodiment, underlying electrode layer 26 is formed, for example, using ink jet as a baked layer. A method of forming underlying electrode layer 26 using ink jet will be described below. When underlying electrode layer 26 is a thin film layer, underlying electrode layer 26 is formed by a thin film forming method, such as sputtering or vapor deposition, for example.

Figure 12:
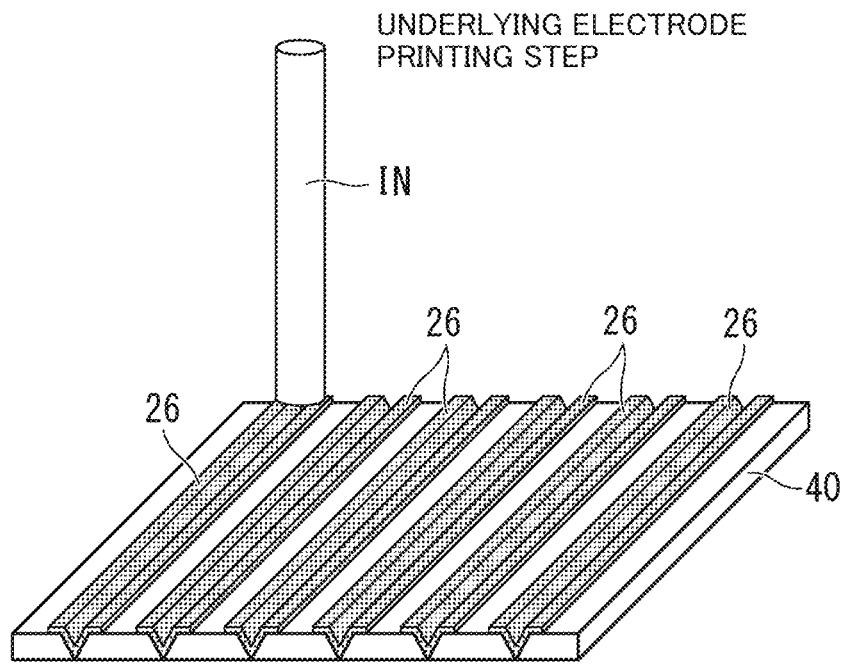
FIG. 12 schematically illustrates a method of manufacturing a multilayer ceramic capacitor, which is an example of a multilayer ceramic electronic component according to a preferred embodiment of the present invention.

Case where Ink Jet is Used as Underlying Electrode Layer (5) An unfired underlying electrode layer 26 is formed using ink jet as shown in FIG. 12 in a groove of a green multilayer block 40 which is cut in V shape to expose the internal electrode layers at first cutting step ST1. Specifically, an external electrode paste including Ni as a main component is applied onto the first end surface, the second end surface, and the second main surface of multilayer block 40, cut with tapered blade TB, by ink jet so as to be discharged through an ink nozzle IN. On this occasion, the external electrode paste is applied onto the underlying electrode layer by ink jet so as to be discharged through ink nozzle IN in the second main surface direction. As a result, the paste comes around the opposite side surfaces due to the effect of the tapered structure, thus enabling simultaneous application of the paste onto the opposite end surfaces (inclined surfaces) in addition to the second main surface (see FIG. 12). This step corresponds to an underlying electrode printing step ST2.

Figure 13:
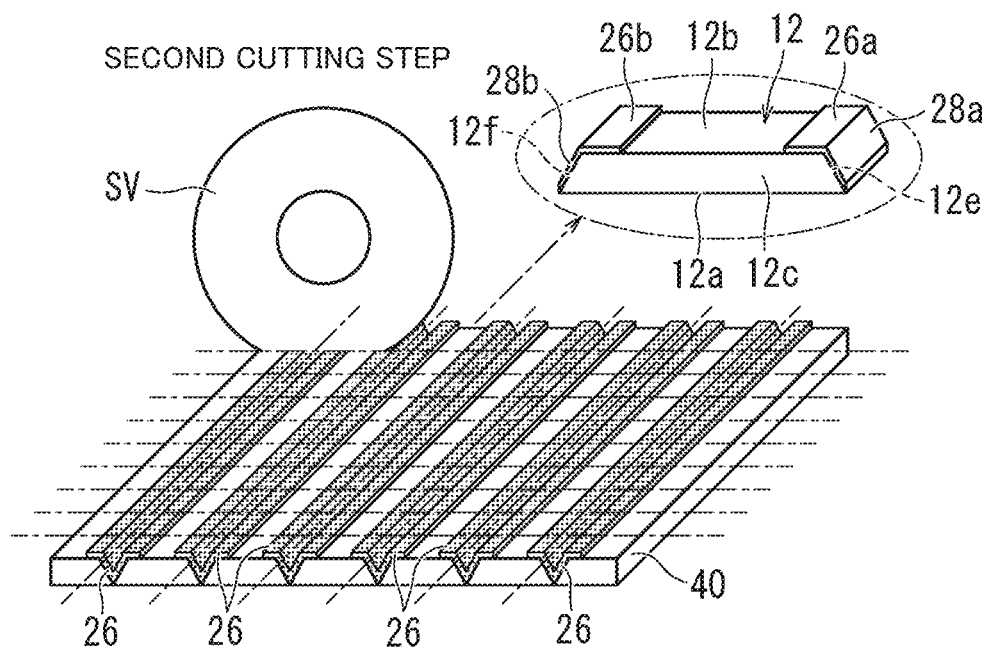
FIG. 13 schematically illustrates a method of manufacturing a multilayer ceramic capacitor, which is an example of a multilayer ceramic electronic component according to a preferred embodiment of the present invention.

(6) Subsequently, as shown in FIG. 13, multilayer block 40 is subjected to dicer cutting with a normal blade SV into pieces, to thus obtain a multilayer body chip (multilayer body 12 and underlying electrode layer 26). In the present preferred embodiment, normal blade SV used in this step is a blade normally referred to as a double-edged blade. First side surface 12c and second side surface 12d formed at this point of time are thus perpendicular or approximately perpendicular. This step corresponds to a second cutting step.

(7) A multilayer body chip is fired. A firing temperature is preferably not lower than about 900° C. and not higher than about 1300° C., for example, depending on ceramic or the material of the internal electrode layer. Through this firing, the conductive paste layer is baked, to thus form an internal electrode layer. Also, the external electrode paste is baked, to thus form underlying electrode layer 26.

(8) Subsequently, first plating layer 30a and second plating layer 30b are formed on underlying electrode layer 26 formed of the baked layer and on a surface of multilayer body 12 as required. In the present preferred embodiment, first plating layer 30a and second plating layer 30b each include a three-layer structure including a Cu plating layer, a Ni plating layer, and a Sn plating layer (see FIGS. 6 to 9). This step corresponds to a plating layer forming step ST4 (not shown) according to the present preferred embodiment.

As described above, in the present preferred embodiment, underlying electrode layer 26 is formed by ink jet, and then, plating layer 30 is formed, to thus form external electrode 24, as shown in FIGS. 10 to 13.

Case where Thin Film Layer (Sputter) is Formed as Underlying Electrode Layer (5) Underlying electrode layer 26 can also be formed by sputtering. After firing a multilayer body chip on the same conditions as those described above after steps (1) and (3) described with reference to the above figures, the second main surface is aligned with the direction in which a thin film is formed, and sputtering is performed, to thus form underlying electrode layer 26 including a Ni/Cu alloy as a main component onto the second main surface and the opposite end surfaces by sputtering. In multilayer body 12, a relationship B<A is satisfied, where A denotes a length of multilayer body 12 on first main surface 12a in the length direction connecting a point of intersection of first main surface 12a and first end surface 12e with a point of intersection of first main surface 12a and second end surface 12f, and B denotes a length of multilayer body 12 on second main surface 12b in the length direction connecting a point of intersection of second main surface 12b and first end surface 12e with a point of intersection of second main surface 12b and second end surface 12f. Thus, through the formation using not only ink jet but also sputtering, underlying electrode layer 26 that is much thinner than that obtained by ink jet can be formed.

(6) Subsequently, plating layer 30 is formed on underlying electrode layer 26 formed of a thin film layer and on a surface of multilayer body 12 as required, to thereby form external electrode 24.

In this manner, multilayer ceramic capacitor 10 is manufactured.

Multilayer ceramic capacitor 10 according to the present preferred embodiment has a relationship B<A, where A denotes a length of multilayer body 12 on first main surface 12a in the length direction connecting a point of intersection of first main surface 12a and first end surface 12e with a point of intersection of first main surface 12a and second end surface 12f, and B denotes a length of multilayer body 12 on second main surface 12b in the length direction connecting a point of intersection of second main surface 12b and first end surface 12e with a point of intersection of second main surface 12b and second end surface 12f. This enables the formation of underlying electrode layer 26 simultaneously not only on second main surface 12b but also on first end surface 12e and on second end surface 12f using ink jet without using different techniques. This facilitates control of a film thickness of underlying electrode layer 26, so that a continuous and uniform film thickness shape can be achieved more easily. Consequently, film thickness can be controlled precisely also in the formation of a plating layer performed later, thus enabling the formation of an external electrode without variations in the strength as an entire external electrode and also eliminates the need to form a plating film with an unnecessarily large thickness. According to the method of manufacturing a multilayer ceramic capacitor, thus, the thicknesses of underlying electrode layer 26 and plating layer 30 can be reduced, and multilayer body can correspondingly have an increased thickness within the dimensional standard of multilayer ceramic capacitor 10, leading to an improved mechanical strength of multilayer ceramic capacitor 10.

3. Mount Structure for Multilayer Ceramic Electronic Component

Next, a mount structure for a multilayer ceramic electronic component according to a preferred embodiment of the present invention will be described.

Figure 14:
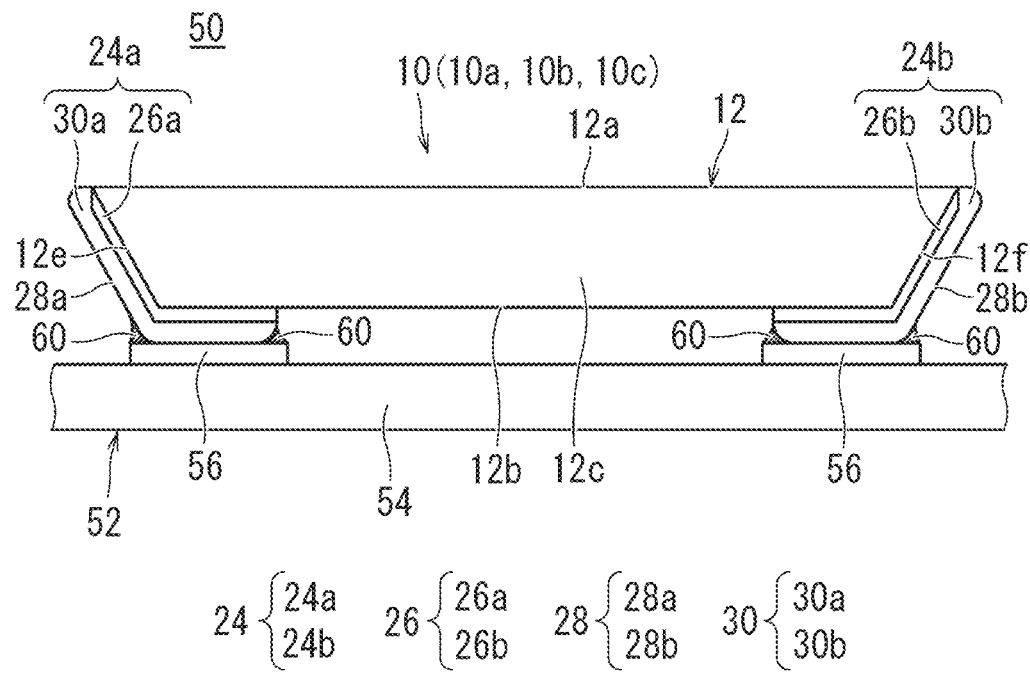
FIG. 14 schematically illustrates a mount structure for a multilayer ceramic capacitor, which is an example of a multilayer ceramic electronic component according to a preferred embodiment of the present invention.

FIG. 14 schematically illustrates a mount structure for a multilayer ceramic electronic component according to a preferred embodiment of the present invention.

A mount structure 50 in which multilayer ceramic capacitor 10 is mounted on signal electrodes 56 provided on circuit board 52 as an example multilayer ceramic electronic component will be described below.

Circuit board 52 is a substrate obtained by bonding a plurality of signal electrodes 56 onto a surface of a core member 54 of the substrate, as shown in FIG. 14. The material of core member 54 on this occasion is a substrate made of a material obtained by impregnating a base material including glass fabric (cloth) and glass non-woven fabric with an epoxy resin or a polyimide resin or a ceramic substrate produced by baking a sheet including a mixture of ceramic and glass.

Although the thickness of core member 54 is not particularly limited, for example, core member 54 having a thickness of not less than about 200 μm and not greater than about 800 μm can preferably be used.

Signal electrodes 56 are bonded to one surface or both surfaces of the core member. The external electrodes of multilayer ceramic capacitor 10 are mounted on signal electrodes 56 with solder 60.

Although the material of signal electrodes 56 is not particularly limited, for example, metals such as copper, gold, palladium, and platinum can preferably be used.

Although the thickness of signal electrodes 56 is not particularly limited, for example, signal electrode 56 having a thickness of not less than about 20 μm and not greater than about 200 μm can preferably be used.

Alternatively, multilayer ceramic capacitor 10 can be mounted using solder 60 so as to bridge different lead frames made of copper or aluminum, which defines and functions as wires.

Second main surface 12b of multilayer ceramic capacitor 10 is disposed so as to face circuit board 52, and first external electrode 24a disposed on a portion of second main surface 12b and second external electrode 24b disposed on a portion of second main surface 12b are connected to signal electrodes 56. More specifically, a side B of multilayer body 12 faces circuit board 52, where A denotes a length of multilayer body 12 on first main surface 12a in the length direction connecting a point of intersection of first main surface 12a and first end surface 12e with a point of intersection of first main surface 12a and second end surface 12f, and B denotes a length of multilayer body 12 on second main surface 12b in the length direction connecting a point of intersection of second main surface 12b and first end surface 12e with a point of intersection of second main surface 12b and second end surface 12f. This enables mounting with no external electrodes disposed on the top surface side of multilayer ceramic capacitor 10 which is mounted on circuit board 52, thus reducing or preventing solder 60 from wetting up onto multilayer body 12 on the top surface side of multilayer ceramic capacitor 10. The height of mounting can thus be reduced, enabling lower-profile mounting.

The external electrode can have a larger width (tapered shape) toward the top surface (first main surface 12a) of multilayer ceramic capacitor 10 mounted on circuit board 52, thus reducing or preventing solder 60 from wetting up toward above the external electrode of multilayer ceramic capacitor 10 in the first place. This can more reliably reduce or prevent solder 60 from wetting up onto multilayer body 12 on the top surface side of multilayer ceramic capacitor 10. In other words, with a mount structure for a multilayer ceramic electronic component according to the present preferred embodiment, higher-quality mounting is achieved.

Although a preferred embodiment of the present invention has been disclosed above, the present invention is not limited thereto.

The present invention is not limited to the above preferred embodiment and can be variously modified without departing from the scope of the present invention.

For example, although first side surface 12c and second side surface 12d are perpendicular or approximately perpendicular in the above preferred embodiment, first side surface 12c and second side surface 12d may be inclined. In such a case, it is preferable that a tapered surface with a decreasing distance between first side surface 12c and second side surface 12d is provided from first main surface 12a to second main surface 12b.

Although the present preferred embodiment has disclosed only multilayer ceramic capacitor 10 which is bilaterally symmetrical or approximately bilaterally symmetrical in front view, multilayer ceramic capacitor 10 which is bilaterally asymmetrical in front view may be provided.

In other words, in connection with the mechanism, shape, material, number, position, arrangement, or the like in the preferred embodiment described above, various modifications can be made without departing from the scope of the technical idea and purpose of the present invention, and such modifications can be included in the present invention.

An experimental example of a preferred embodiment of the present invention will be described below. This experimental example does not limit the scope of protection of the present invention in any way whatsoever.

4. Experimental Example

Multilayer ceramic capacitors with the structure shown in FIGS. 1 to 9 and the following specifications were produced by the manufacturing method according to the preferred embodiment described above, and a deflective strength test and a moisture resistance reliability test were conducted.

Specifications of multilayer ceramic capacitors produced as Examples 1 to 5
  Dimensions of multilayer ceramic capacitor: L×W×T2=about 1 mm×about 0.5 mm×about 0.04 mm
  Dimensions of multilayer body: L×W×T1=about 1 mm×about 0.5 mm×about 0.027 mm
  Material of ceramic layer: $BaTiO_3$
  Capacity: about 40 μF
  Rated voltage: about 6.3 V
  Material of internal electrode layer: Ni
  Structure of external electrode
  Underlying electrode layer: an underlying electrode layer was formed by ink jet, Ni was used as a metal component, and $BaTiO_3$ was used as a ceramic component.
  Thicknesses of Underlying Electrode Layers:
  Thicknesses of the first underlying electrode layer and the second underlying electrode layer in a direction perpendicular or substantially perpendicular to a side of the first end and a side of the second end at positions, with a length of a half of the side of the first end surface and a length of a half of the side of the second end surface, of the first underlying electrode layer and the second underlying electrode layer located on the first end surface and on the second end surface (thicknesses at the centers of end surfaces): about 1 μm
  Thicknesses of the first underlying electrode layer (baked layer) and the second underlying electrode layer (baked layer) in the height direction connecting the first main surface with the second main surface at positions, each with a length of a half of a widthwise length, of the first underlying electrode layer and the second underlying electrode layer located on parts of the second main surface (thicknesses at the centers of end-to-end dimension): about 1 μm
  Plating layer: includes three layers including a Cu plating layer, a Ni plating layer, and a Sn plating layer from the multilayer body side.
  Average thickness of Cu plating layer: about 6 μm
  Average thickness of Ni plating layer: about 3 μm
  Average thickness of Sn plating layer: about 3 μm
  Thickness of each structure in stacking direction (Tmax=thickness of multilayer body and thickness of external electrode)
  Thickness of external electrode in stacking direction: thickness of underlying electrode layer, about 1 μm+thickness of Cu plating layer, about 6 μm+thickness of Ni plating layer, about 3 μm+thickness of Sn plating layer, about 3 μm=about 13 μm Taking the above requirements into account,
  a multilayer ceramic capacitor where $\theta 1$=about 10°, $\theta 2$=about 10°, and $\theta 4$=about 80° was Example 1,
  a multilayer ceramic capacitor where $\theta 1$=about 20°, $\theta 2$=about 20°, and $\theta 4$=about 70° was Example 2,
  a multilayer ceramic capacitor where $\theta 1$=about 30°, $\theta 2$=about 30°, and $\theta 4$=about 60° was Example 3,
  a multilayer ceramic capacitor where $\theta 1$=about 40°, $\theta 2$=about 40°, and $\theta 4$=about 50° was Example 4, and
  a multilayer ceramic capacitor where $\theta 1$=about 50°, $\theta 2$=about 50°, and $\theta 4$=about 40° was Example 5, which have been described in the above preferred embodiment particularly with reference to FIG. 2.

The designs, structures, and test methods of Comparative Examples 1 to 4 will be described below with reference to FIGS. 15 to 19. In the following description, elements corresponding to those of the above preferred embodiment will be denoted by the same references, detailed description of which will be omitted.

Design of Comparative Example 1 ($\theta 1$=about 0°, $\theta 2$=about 0°, $\theta 4$=about 90°)

Figure 15:
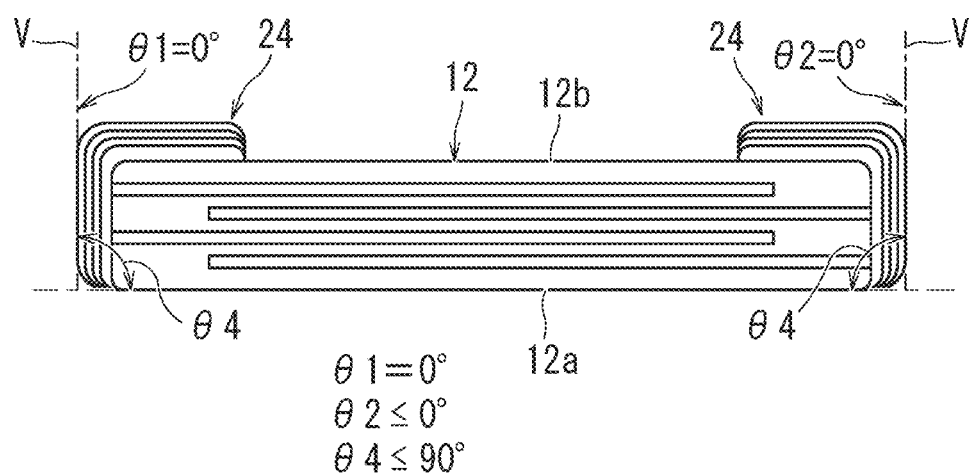
FIG. 15 shows a multilayer ceramic capacitor according to Comparative Example 1 for comparison with a multilayer ceramic capacitor according to a preferred embodiment of the present invention in an experiment example.

A multilayer ceramic capacitor which basically had the same or substantially the same configuration as those of Examples 1 to 5 and where $\theta 1$=about 0°, $\theta 2$=about 0°, and $\theta 4$=about 90° as shown in FIG. 15 was Comparative Example 1.

Design of Comparative Example 2 ($\theta 1$=about 60°, $\theta 2$=about 60°, $\theta 4$=about 30°

Figure 16:
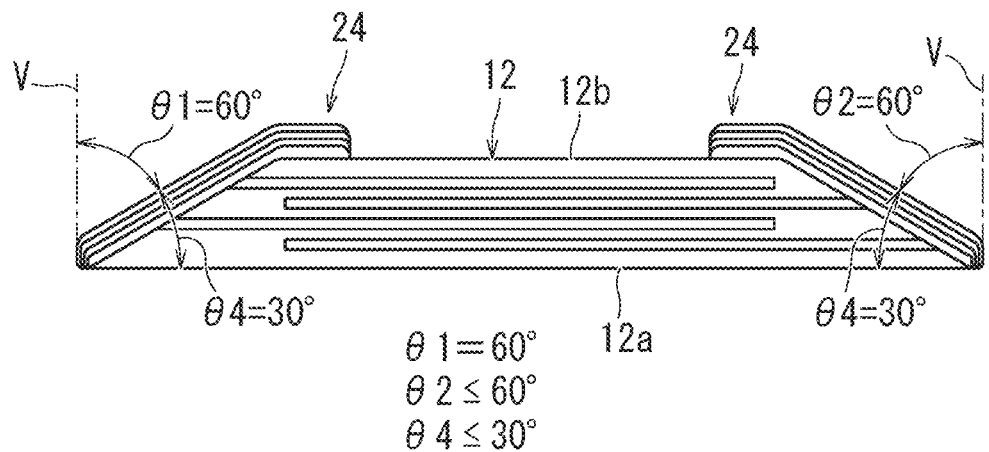
FIG. 16 shows a multilayer ceramic capacitor according to Comparative Example 2 for comparison with a multilayer ceramic capacitor according to a preferred embodiment of the present invention in an experiment example.

A multilayer ceramic capacitor which basically had the same or substantially the same configuration as those of Examples 1 to 5 and where $\theta 1$=about 60°, $\theta 2$=about 60°, and $\theta 4$=about 30° as shown in FIG. 16 was Comparative Example 2.

Design of Comparative Example 3 (Square U-Shape)

Figure 17:
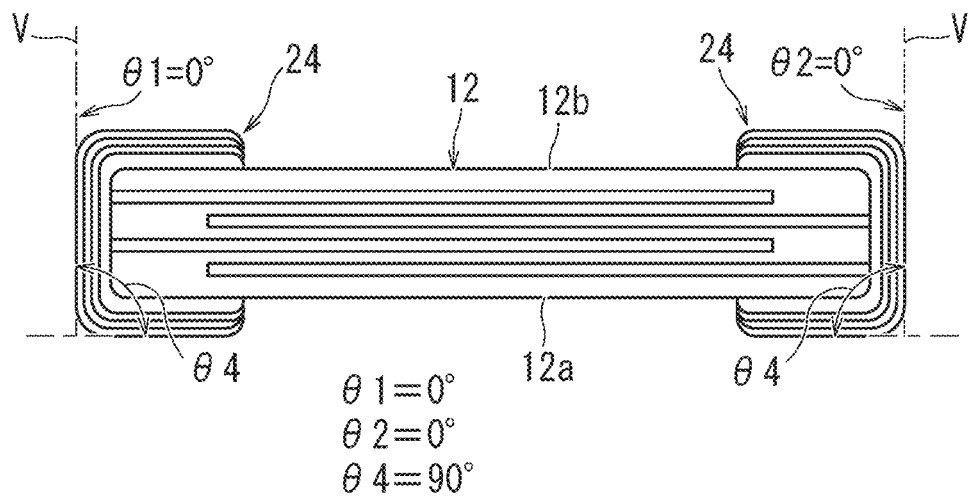
FIG. 17 shows a multilayer ceramic capacitor according to Comparative Example 3 for comparison with a multilayer ceramic capacitor according to a preferred embodiment of the present invention in an experiment example.

The design of Comparative Example 3 will be described below with reference to FIG. 17.

Comparative Example 3 which had external electrode 24 formed entirely in a square U-shape (channel shape) and where $\theta 1$=about 0°, $\theta 2$=about 0°, and $\theta 4$=about 90° was designed as follows.
  Dimensions of multilayer ceramic capacitor: L×W×T2=about 1 mm×about 0.5 mm×about 0.040 mm
  Dimensions of multilayer body: L×W×T1=about 1 mm×about 0.5 mm×about 0.012 mm
  Material of ceramic layer: $BaTiO_3$
  Capacity: about 24 μF
  Rated voltage: about 6.3 V
  Material of internal electrode layer: Ni
  Structure of external electrode
  Underlying electrode layer: an underlying electrode layer was formed by ink jet, Ni was used as a metal component, and $BaTiO_3$ was used as a ceramic component.

Thicknesses of Underlying Electrode Layers:

Thicknesses of the first underlying electrode layer and the second underlying electrode layer in a direction perpendicular or substantially perpendicular to a side of the first end and a side of the second end at positions, with a length of a half of the side of the first end surface and a length of a half of the side of the second end surface, of the first underlying electrode layer and the second underlying electrode layer located on the first end surface and on the second end surface (thicknesses at the centers of end surfaces): about 2 μm Thicknesses of the first underlying electrode layer (baked layer) and the second underlying electrode layer (baked layer) in the height direction connecting the first main surface with the second main surface at positions, each with a length of a half of a widthwise length, of the first underlying electrode layer and the second underlying electrode layer located on parts of the second main surface (thicknesses at the centers of end-to-end dimension): about 2 μm Plating layer: formed of three layers including a Cu plating layer, a Ni plating layer, and a Sn plating layer from the multilayer body side.

Average thickness of Cu plating layer: about 6 μm

Average thickness of Ni plating layer: about 3 μm

Average thickness of Sn plating layer: about 3 μm

Thickness of external electrode in stacking direction: (thickness of underlying electrode layer, about 2 μm+thickness of Cu plating layer, about 6 μm+thickness of Ni plating layer, about 3 μm+thickness of Sn plating layer, about 3 μm)×2=about 28 μm Design of Comparative Example 4 (L-Shape)

Figure 18:
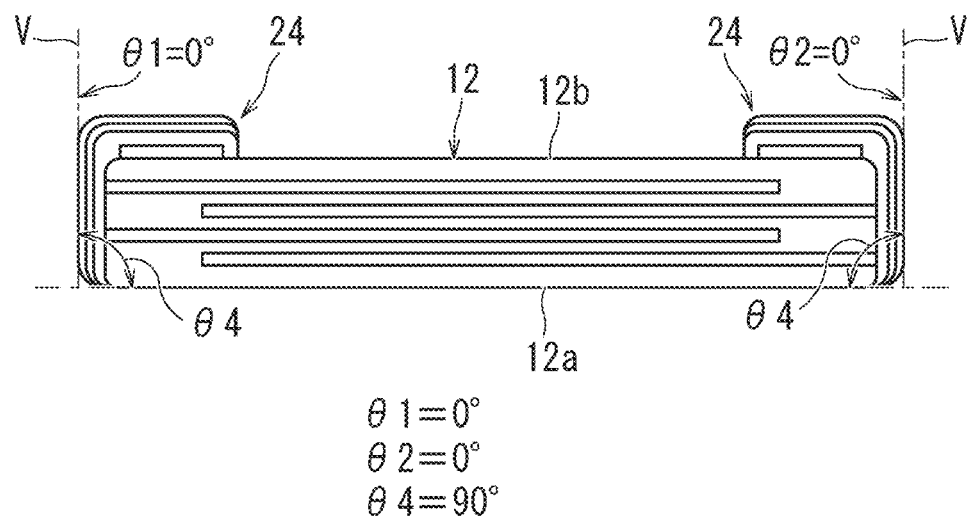
FIG. 18 shows a multilayer ceramic capacitor according to Comparative Example 4 for comparison with a multilayer ceramic capacitor according to a preferred embodiment of the present invention in an experiment example.

The design of Comparative Example 4 will be described below with reference to FIG. 18.

Comparative Example 4 which included external electrode having an L-shape (an inverted L-shape in FIG. 18) and underlying electrode layer 26 provided on second main surface 12b alone and where θ1=about 0°, θ2=about 0°, and θ4=about 90° was designed as follows.

Dimensions of multilayer ceramic capacitor: L×W×T2=about 1 mm×about 0.5 mm×about 0.040 mm Dimensions of multilayer body: L×W×T1=about 1 mm×about 0.5 mm×about 0.024 mm Material of ceramic layer: $BaTiO_3$ Capacity: about 32 μF Rated voltage: about 6.3 V Material of internal electrode layer: Ni Structure of external electrode Underlying electrode layer: an underlying electrode layer was formed by ink jet, Ni was used as a metal component, and $BaTiO_3$ was used as a ceramic component.

Thickness of Underlying Electrode Layer:

No underlying electrode layer was provided on the first end surface and on the second end surface.

Thicknesses of the first underlying electrode layer (baked layer) and the second underlying electrode layer (baked layer) in the height direction connecting the first main surface with the second main surface at positions, each with a length of a half of a widthwise length, of the first underlying electrode layer and the second underlying electrode layer located on parts of the second main surface (thicknesses at the centers of end-to-end dimension): about 1 μm Plating layer: formed of three layers including a Cu plating layer, a Ni plating layer, and a Sn plating layer from the multilayer body side.

Average thickness of Cu plating layer: about 9 μm

Average thickness of Ni plating layer: about 3 μm

Average thickness of Sn plating layer: about 3 μm

Thickness of external electrode in stacking direction: thickness of underlying electrode layer, about 1 μm+thickness of Cu plating layer, about 9 μm+thickness of Ni plating layer, about 3 μm+thickness of Sn plating layer, about 3 μm=about 16 μm In the case of a normal L-shaped structure, a plating needs to be forcibly extended from the LW surface to the opposite end surface sides, and in this case, the thicknesses of the portions of the WT surface and the LW surface have a relationship LW surface>WT surface.

Further, for the above structure of each of the electrodes, a multilayer body with a maximum value of T2 set to about 40 μm was designed.

Method of Measuring Dimension a, Dimension B

Samples were produced such that thickness T2 of a multilayer ceramic capacitor in the stacking direction including an external electrode was about 40 μm. Subsequently, a resin was hardened, the LT surface was polished, and then, dimension A and dimension B were measured at a cross-section with a half of the distance in the W direction.

Deflective Strength Test

Figure 19:
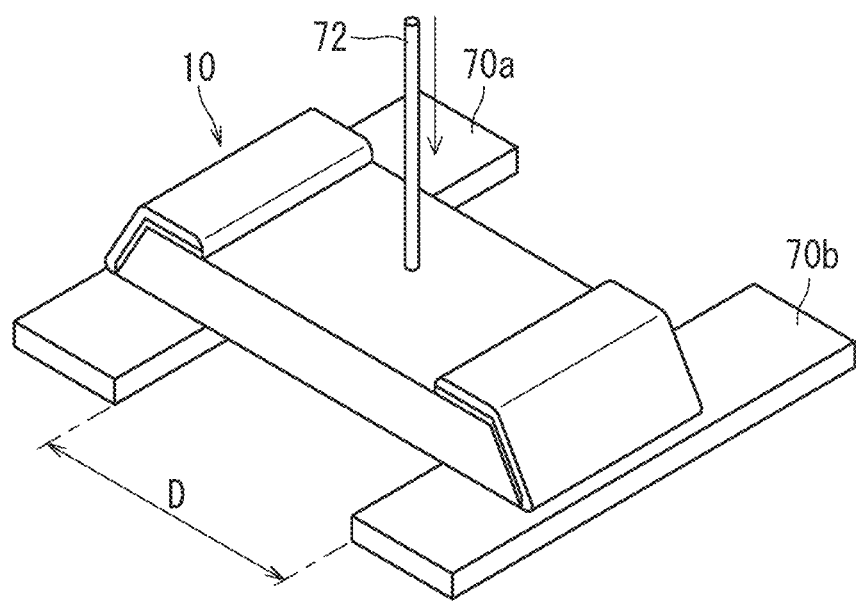
FIG. 19 is a perspective view for illustrating a deflective strength test in an experiment example.

FIG. 19 is a perspective view for illustrating a deflective strength test. The deflective strength test was conducted as follows:

Specifically, as shown in FIG. 19, a distance D between chip holding bases 70a and 70b was set to about 400 μm, and the center on the second main surface side of the multilayer ceramic capacitor, being a sample, was pushed with a pushing bar 72 having a diameter of about 50 μm. A push force was gradually increased up to about 0.5 N. For defectives of the inner structure, the LT surface was polished up to a position with a half of the distance in width direction y, and the presence or absence of a crack was checked. As the evaluation quantity, 25 samples were evaluated in each preferred embodiment and each comparative example. Table 1 shows the number of defectives generated in the internal structure. A sample with a crack was rated as not good (NG), a sample with no crack was rated as good (G), and then, the number of defectives was counted.

Moisture Resistance Reliability Test

A moisture resistance reliability test was conducted through a moisture resistance load test in which a voltage of not greater than about 3.2 V was maintained for about 72 hours at a temperature of about 125° C. and a humidity of about 95%. A sample with an insulation resistance value of not less than about 1 MΩ after the moisture resistance load test was rated as not good (NG), and the number of defectives was counted.

A condition in which the number of defectives in terms of moisture resistance reliability was 0/100 was rated as good (G), and the others were rated as not good (NG).

Table 1 shows the results of the deflective strength test and the moisture resistance reliability test in the examples and comparative examples.

TABLE 1

| | TAPER ANGLE (θ1, θ2) (*) | DIMENSION A (mm) | DIMENSION B (mm) | DEFLECTIVE STRENGTH TEST | MOISTURE RESISTANCE RELIABILITY TEST | DETERMINATION |
|---|---|---|---|---|---|---|
| COMPARATIVE EXAMPLE 1 | 0 | 1.00 | 1.00 | G | 11 PIECES/ 100 PIECES | x |
| EXAMPLE 1 | 10 | 1.00 | 0.98 | G | G | ○ |
| EXAMPLE 2 | 20 | 1.00 | 0.97 | G | G | ○ |
| EXAMPLE 3 | 30 | 1.00 | 0.96 | G | G | ○ |
| EXAMPLE 4 | 40 | 1.00 | 0.95 | G | G | ○ |
| EXAMPLE 5 | 50 | 1.00 | 0.92 | G | G | ○ |
| COMPARATIVE EXAMPLE 2 | 60 | 1.00 | 0.90 | G | 13 PIECES/ 100 PIECES | x |
| COMPARATIVE EXAMPLE 3 (SQUARE U-SHAPE) | — | 1.00 | 1.00 | 23 PIECES/ 25 PIECES | G | x |
| COMPARATIVE EXAMPLE 4 (L-SHAPE) | — | 1.00 | 1.00 | 5 PIECES/ 25 PIECES | G | x |

As shown in Table 1, the samples of the multilayer ceramic capacitors according to Examples 1 to 5 had a relationship B<A, where A denotes a length of the multilayer body on the first main surface in the length direction connecting a point of intersection of the first main surface and the first end surface with a point of intersection of the first main surface and the second end surface, and B denotes a length of the multilayer body on the second main surface in the length direction connecting a point of intersection of the second main surface and the first end surface with a point of intersection of the second main surface and the second end surface. The samples also had a relationship of about 10°≤θ1≤about 50° and a relationship of about 10°≤θ2≤about 50°. Thus, no defective was found in the results of the deflective strength test, and no defective was found in the results of the moisture resistance reliability test, yielding good results in both of the tests.

In contrast, in the samples of the multilayer ceramic capacitor according to Comparative Example 1, θ1=about 0° and θ2=about 0°, and accordingly, the deflective strength test revealed that three defectives occurred among 25 samples. Also, the L gap was small, and accordingly, the moisture resistance reliability test revealed that 11 defectives occurred among 100 results.

The samples of the multilayer ceramic capacitor according to Comparative Example 2 had a relationship θ1=about 60° and a relationship θ2=about 60°, and accordingly, the deflective strength test yielded good results. However, a thin portion occurred in the L gap, and accordingly, the results of the moisture resistance reliability test revealed that 13 defectives occurred among 100 samples.

The samples of the multilayer ceramic capacitor according to Comparative Example 3 had external electrode 24 entirely having a square U-shape (channel shape) and had a relationship θ1=about 0° and a relationship θ2=about 0°. Thus, 23 defectives occurred among 25 samples in the deflective strength test, but no defectives occurred in the moisture resistance test owing to a small L gap.

In the samples of the multilayer ceramic capacitor according to Comparative Example 4, underlying electrode layer 26 was provided only on second main surface 12b, θ1=about 0°, and θ2=about 0°. Thus, five detectives occurred among 25 samples in the deflective strength test, but no detectives occurred in the moisture resistance test owing to a large L gap.

The above results reveal the following regarding the samples of the multilayer ceramic capacitors according to preferred embodiments of the present invention. In a thin multilayer ceramic capacitor, in which thickness T1 of the multilayer body is within the range about 27 µm≤T1≤about 97 µm, a relationship B<A is satisfied, where A denotes a length of the multilayer body on the first main surface in the length direction connecting a point of intersection of the first main surface and the first end surface with a point of intersection of the first main surface and the second end surface, and B denotes a length of the multilayer body on the second main surface in the length direction connecting a point of intersection of the second main surface and the first end surface with a point of intersection of the second main surface and the second end surface. Thus, an underlying electrode layer can be formed simultaneously not only on the second main surface but also on the first end surface and the second end surface, using ink jet which enables easy control of a film thickness in the formation of an underlying electrode layer of an external electrode. This facilitates control of the film thickness of the underlying electrode layer, so that a continuous and uniform film thickness shape can be easily achieved. Consequently, film thickness can be controlled precisely also in the formation of a plating layer thereafter. This enables the formation of an external electrode without any variations in the strength of the entire external electrode and also eliminates the need to provide a plating layer with an unnecessarily large thickness.

It has been revealed that the thicknesses of the underlying electrode layer and the plating layer can be reduced and the multilayer body can correspondingly have an increased thickness within the dimensional standard of a multilayer ceramic capacitor, leading to an improved mechanical strength of the multilayer ceramic capacitor.

It has also been revealed that in preferred embodiments of the present invention, angle θ1 between the first end surface and a perpendicular extending from a side of the first main surface at a point of intersection of the first main surface and the first end surface and angle θ2 between the second end surface and a perpendicular extending from a side of the first main surface at a point of intersection of the first main surface and the second end surface have a relationship of about 10°≤θ1≤about 50° and a relationship of about 10°≤θ2≤about 50°, and accordingly, the mechanical strength of the multilayer ceramic capacitor described above can be improved, and moisture resistance reliability can be ensured.

In preferred embodiments of the present invention, since no external electrode is provided on the first main surface, the thickness of the multilayer body can be increased further within the dimensional standard of the multilayer ceramic capacitor, leading to a further improved mechanical strength of the multilayer ceramic electronic component.

Note that satisfying the above relationship B<A enables the formation of an underlying electrode layer simultaneously (in one step) on the second main surface, the first end surface, and the second end surface using not only ink jet but also sputtering printing. Consequently, an underlying electrode layer much thinner than that obtained through screen printing can be provided, leading to more advantageous effects of preferred embodiments of the present invention described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer body including a stack of a plurality of ceramic layers and including a first main surface and a second main surface facing each other in a height direction, a first side surface and a second side surface facing each other in a width direction orthogonal or substantially orthogonal to the height direction, and a first end surface and a second end surface facing each other in a length direction connecting the first main surface and the second main surface with the first side surface and the second side surface;
   a first internal electrode layer on a corresponding one of the plurality of ceramic layers and located inside the multilayer body;
   a second internal electrode layer on a corresponding one of the plurality of ceramic layers and located inside the multilayer body;
   a first external electrode on the first end surface and on a portion of the second main surface; and
   a second external electrode on the second end surface and on a portion of the second main surface; wherein
   the plurality of ceramic layers are stacked in the height direction;
   a relationship B<A is satisfied, where A denotes a length of the multilayer body on the first main surface in the length direction connecting a point of intersection of the first main surface and the first end surface with a point of intersection of the first main surface and the second end surface, and B denotes a length of the multilayer body on the second main surface in the length direction connecting a point of intersection of the second main surface and the first end surface with a point of intersection of the second main surface and the second end surface;
   a relationship of about 10°≤θ1≤about 50° and a relationship of about 10°≤θ2≤about 50° are satisfied, where θ1 denotes an angle between the first end surface and a perpendicular extending from a side of the first main surface at the point of intersection of the first main surface and the first end surface, and θ2 denotes an angle between the second end surface and a perpendicular extending from a side of the first main surface at the point of intersection of the first main surface and the second end surface;
   an end of the first internal electrode layer is electrically connected to the first external electrode on the first end surface;
   an end of the second internal electrode layer is electrically connected to the second external electrode on the second end surface;
   the end of the first internal electrode layer is slanted with respect to the length direction; and
   the end of the second internal electrode layer is slanted with respect to the length direction.

2. The multilayer ceramic electronic component according to claim 1, wherein a dimension of the multilayer body in the height direction connecting the first main surface with the second main surface is not less than about 27 μm and not greater than about 97 μm.

3. The multilayer ceramic electronic component according to claim 1, wherein a dimension of the multilayer ceramic electronic component in the height direction connecting the first main surface with the second main surface is not less than about 37 μm and not greater than about 110 μm.

4. The multilayer ceramic electronic component according to claim 1, wherein the second main surface has an area smaller than an area of the first main surface.

5. The multilayer ceramic electronic component according to claim 1, wherein
   the first external electrode and the second external electrode each include an underlying electrode layer and a plating layer;
   the underlying electrode layer includes a metal component and a ceramic component; and
   the plating layer includes at least one selected from Cu, Ni, Ag, Pd, Ag—Pd alloy, and Au and includes a plurality of layers.

6. The multilayer ceramic electronic component according to claim 1, wherein
   the first external electrode and the second external electrode each include an underlying electrode layer and a plating layer;
   the underlying electrode layer is defined by a thin film electrode and includes at least one selected from the group consisting of Mg, Al, Ti, W, Cr, Cu, Ni, Ag, Co, Mo, and V; and
   the plating layer includes at least one selected from Cu, Ni, Ag, Pd, Ag—Pd alloy, and Au and includes a plurality of layers.

7. The multilayer ceramic electronic component according to claim 6, wherein the plating layer includes a Cu plating layer disposed on the underlying electrode layer, a Ni plating layer disposed on the Cu plating layer, and a Sn plating layer disposed on the Ni plating layer.

8. The multilayer ceramic electronic component according to claim 6, wherein a plurality of the thin film electrodes are provided.

9. A mount structure for a multilayer ceramic electronic component according to claim 1, the mount structure comprising:
   a circuit board; and
   a plurality of signal electrodes disposed on a surface of the circuit board; wherein
   the second main surface faces the circuit board, and the plurality of signal electrodes are connected with the first external electrode disposed on a portion of the second main surface and the second external electrode disposed on a portion of the second main surface.

10. The multilayer ceramic electronic component according to claim 1, wherein a dimension of the multilayer ceramic electronic component in the length direction is not less than about 0.2 mm and not greater than about 1 mm.

11. The multilayer ceramic electronic component according to claim 1, wherein a dimension of the multilayer ceramic electronic component in the height direction connecting the first main surface with the second main surface is not less than about 40 μm and not greater than about 110 μm.

12. The mount structure according to claim 9, wherein a dimension of the multilayer body in the height direction connecting the first main surface with the second main surface is not less than about 27 μm and not greater than about 97 μm.

13. The mount structure according to claim 9, wherein a dimension of the multilayer ceramic electronic component in the height direction connecting the first main surface with the second main surface is not less than about 37 μm and not greater than about 110 μm.

14. The mount structure according to claim 9, wherein the second main surface has an area smaller than an area of the first main surface.

15. The mount structure according to claim 9, wherein
the first external electrode and the second external electrode each include an underlying electrode layer and a plating layer;
the underlying electrode layer includes a metal component and a ceramic component; and
the plating layer includes at least one selected from Cu, Ni, Ag, Pd, Ag—Pd alloy, and Au and includes a plurality of layers.

16. The mount structure according to claim 9, wherein
the first external electrode and the second external electrode each include an underlying electrode layer and a plating layer;
the underlying electrode layer is defined by a thin film electrode and includes at least one selected from the group consisting of Mg, Al, Ti, W, Cr, Cu, Ni, Ag, Co, Mo, and V; and
the plating layer includes at least one selected from Cu, Ni, Ag, Pd, Ag—Pd alloy, and Au and includes a plurality of layers.

17. The mount structure according to claim 16, wherein the plating layer includes a Cu plating layer disposed on the underlying electrode layer, a Ni plating layer disposed on the Cu plating layer, and a Sn plating layer disposed on the Ni plating layer.

18. The mount structure according to claim 16, wherein a plurality of the thin film electrodes are provided.

19. The mount structure according to claim 9, wherein a dimension of the multilayer ceramic electronic component in the length direction is not less than about 0.2 mm and not greater than about 1 mm.

20. The mount structure according to claim 9, wherein a dimension of the multilayer ceramic electronic component in the height direction connecting the first main surface with the second main surface is not less than about 40 μm and not greater than about 110 μm.

* * * * *